(12) United States Patent
Enoki et al.

(10) Patent No.: US 6,421,345 B1
(45) Date of Patent: Jul. 16, 2002

(54) ATM DEVICE

(75) Inventors: Tohru Enoki; Shigeru Nakagawahara, both of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/027,966

(22) Filed: Feb. 23, 1998

(30) Foreign Application Priority Data

Jun. 20, 1997 (JP) .............................................. 9-164621

(51) Int. Cl.[7] .............................................. H04L 12/56
(52) U.S. Cl. .................................. 370/395.21; 370/465
(58) Field of Search .............................. 370/395, 396, 370/397, 398, 399, 422, 421, 428, 429, 437, 438, 439, 447, 458, 459, 461, 462, 465, 468, 477, 395.1, 395.2, 395.21, 395.3, 395.31, 395.22, 395.41

(56) References Cited

U.S. PATENT DOCUMENTS

| | | | | |
|---|---|---|---|---|
| 5,119,367 A | * | 6/1992 | Kawakatsu et al. ......... | 370/232 |
| 5,315,586 A | * | 5/1994 | Charvillat .................... | 370/232 |
| 5,502,714 A | * | 3/1996 | Sallberg ...................... | 370/351 |
| 5,570,355 A | * | 10/1996 | Dail et al. ................... | 370/352 |
| 5,687,167 A | * | 11/1997 | Bertin et al. ................ | 370/254 |
| 5,838,681 A | * | 11/1998 | Bonomi et al. .............. | 370/395 |
| 5,920,544 A | * | 7/1999 | Watanabe .................... | 370/232 |
| 5,987,027 A | * | 11/1999 | Park et al. ................... | 370/360 |
| 6,005,867 A | * | 12/1999 | Tanabe et al. ............... | 370/409 |

FOREIGN PATENT DOCUMENTS

| | | |
|---|---|---|
| JP | 5-153154 | 6/1993 |
| JP | 6-164631 | 6/1994 |
| JP | 6-169316 | 6/1994 |

* cited by examiner

Primary Examiner—Kwang Bin Yao
(74) Attorney, Agent, or Firm—Katten Muchin Zavis Rosenman

(57) ABSTRACT

An ATM device which can be connected to an ATM network via lines includes a first part setting connections on the lines, and a second part moving a connection on a line to another line if a call setup requests a band greater than idle bands of the lines so that the band requested by the call setup can be set on the line from which the connection is moved.

22 Claims, 23 Drawing Sheets

FIG. 9

BAND MANAGEMENT TABLE

| LINE NUMBER |
|---|
| CONNECTION TYPE |
| BAND IN USE |
| IDLE BAND |
| CONNECTION MANAGEMENT TABLE LEADING POINTER |
| CONNECTION MANAGEMENT TABLE END POINTER |

FIG. 10

CONNECTION MANAGEMENT TABLE

| VPI VALUE |
|---|
| VCI VALUE |
| CONNECTION TYPE (CBR, VBR ect) |
| USED BAND |
| REARRANGEMENT RESTRICTION YES/NO |
| CDB NUMBER |
| PREVIOUS CONNECTION MANAGEMENT TABLE POINTER |
| NEXT CONNECTION MANAGEMENT TABLE POINTER |

F I G. 1 9
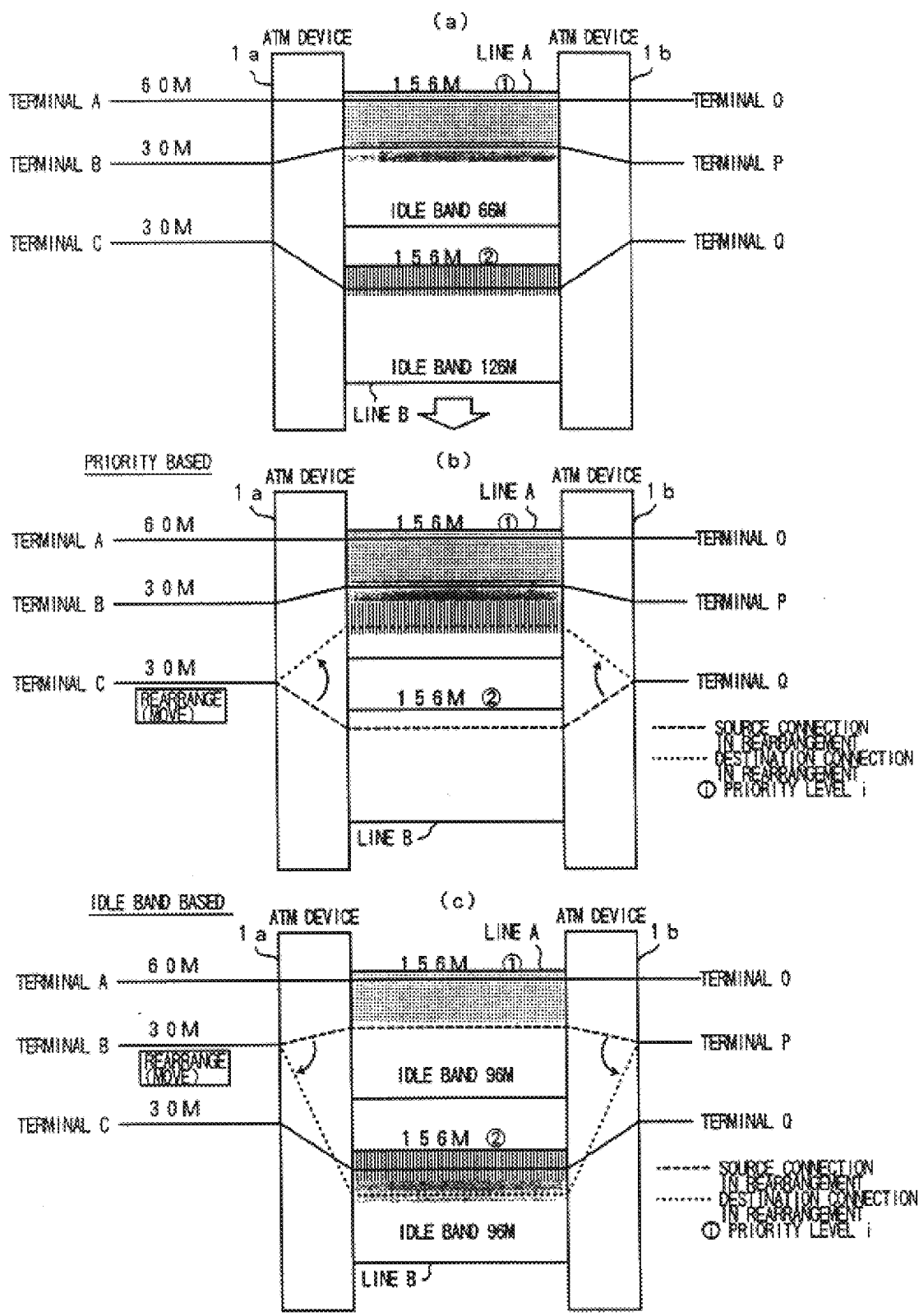

FIG.24

BAND MANAGEMENT TABLE

| LINE # : LINE A |
|---|
| CONNECTION TYPE : CBR |
| IN-USE BAND : 150M |
| IDLE BAND : 0M |
| CONNECTION MANAGEMENT TABLE LEADING POINTER |
| CONNECTION MANAGEMENT END POINTER |

CONNECTION MANAGEMENT TABLE

| VPI=0 |
|---|
| VCI=32 |
| CONNECTION TYPE : CBR |
| USED BAND : 75M |
| OUT OF RESTRICTION |
| CDR # : 1 |
| PREVIOUS CONNECTION MANAGEMENT TABLE POINTER |
| NEXT CONNECTION MANAGEMENT TABLE POINTER |

CONNECTION MANAGEMENT TABLE

| VPI=0 |
|---|
| VCI=33 |
| CONNECTION TYPE : CBR |
| USED BAND : 75M |
| OUT OF RESTRICTION |
| CDR # : 2 |
| PREVIOUS CONNECTION MANAGEMENT TABLE POINTER |
| NEXT CONNECTION MANAGEMENT TABLE POINTER |

BAND MANAGEMENT TABLE

| LINE # : LINE B |
|---|
| CONNECTION TYPE : CBR |
| IN-USE BAND : 0M |
| IDLE BAND : 150M |
| CONNECTION MANAGEMENT TABLE LEADING POINTER |
| CONNECTION MANAGEMENT END POINTER |

FIG.25

BAND MANAGEMENT TABLE

| |
|---|
| LINE # : LINE A |
| CONNECTION TYPE : CBR |
| IN-USE BAND : 150M |
| IDLE BAND : 0M |
| CONNECTION MANAGEMENT TABLE LEADING POINTER |
| CONNECTION MANAGEMENT END POINTER |

CONNECTION MANAGEMENT TABLE

| |
|---|
| VPI=0 |
| VCI=32 |
| CONNECTION TYPE : CBR |
| USED BAND : 75M |
| OUT OF RESTRICTION |
| CDR # : 1 |
| PREVIOUS CONNECTION MANAGEMENT TABLE POINTER |
| NEXT CONNECTION MANAGEMENT TABLE POINTER |

CONNECTION MANAGEMENT TABLE

| |
|---|
| VPI=0 |
| VCI=33 |
| CONNECTION TYPE : CBR |
| USED BAND : 75M |
| OUT OF RESTRICTION |
| CDR # : 2 |
| PREVIOUS CONNECTION MANAGEMENT TABLE POINTER |
| NEXT CONNECTION MANAGEMENT TABLE POINTER |

BAND MANAGEMENT TABLE

| |
|---|
| LINE # : LINE B |
| CONNECTION TYPE : CBR |
| IN-USE BAND : 100M |
| IDLE BAND : 50M |
| CONNECTION MANAGEMENT TABLE LEADING POINTER |
| CONNECTION MANAGEMENT END POINTER |

CONNECTION MANAGEMENT TABLE

| |
|---|
| VPI=0 |
| VCI=32 |
| CONNECTION TYPE : CBR |
| USED BAND : 150M |
| OUT OF RESTRICTION |
| CDR # : 3 |
| PREVIOUS CONNECTION MANAGEMENT TABLE POINTER |
| NEXT CONNECTION MANAGEMENT TABLE POINTER |

ATM DEVICE

BACKGROUND OF THE INVENTION

1. Field of the Invention

The present invention generally relates to a self-routing switch device such as an ATM (Asynchronous Transfer Mode) device, and more particularly to an ATM device which can be connected to another ATM device through a plurality of transmission lines and can set a connection of an SVC (Switched Virtual Connection) call.

Recently, an ISDN (Integrated Services Digital Network) has been practically used as a network in which voice data and communication data can be transferred at a high speed. However, such an ISDN may be insufficient to transfer video data of a high quality.

Now, an ATM is used to realize a multimedia communication capable of transferring all kinds of data such as voice data, communication data and video data due to the recent development and advance of an optical fiber communication technique having a capability of realizing large-capacitance communication and a digital technique of digitizing all communication data.

2. Description of the Related Art

Referring to FIG. 1, the setting of an SVC call in an ATM device which is one of the self-routing switches will be described.

An ATM device 1a and an ATM device 1b are connected together by two transmission lines A and B, each of which lines has a band equal to 156 Mbps. FIG. 1 shows a state in which a connection of an SVC call between terminals A and O is set on the transmission line A, and a connection of an SVC call between terminals D and R is set on the line B.

Further, a connection of an SVC call between terminals D and R is released so that the line A has an idle band equal to 81 Mbps. Similarly, the line B has an idle band equal to 81 Mbps.

If a communication between the terminals C and Q takes place, the ATM device 1a receives, from the terminal C, a call setup request which requests a band equal to, for example, 50 Mbps. Then, the ATM device 1a recognizes a called ATM device and determines a route by referring to a called identification number provided in the call setup request. In this case, the called ATM device is the terminal Q. In FIG. 1, the terminal Q is connected to the ATM device 1b, and thus the ATM device 1a selects the lines A and B, which are routes connected to the ATM device 1b. The ATM device 1a selects a line which meets the requested band 50 Mbps from the selected routes, and sets the SVC call connection. Since each of the lines A and B respectively has an idle band of 81 Mbps, the ATM device 1a can set the SVC call connection to either the line A or B.

As shown in FIG. 1, if the terminals A and Q communicate with each other, the ATM device 1a receives, from the terminal C, a call setup request which requests 100 Mbps band. Then, the ATM device 1a recognizes a called ATM device and determines a route by referring to a called identification number provided in the call setup request. In FIG. 1, the terminal Q is connected to the ATM device 1b, and thus the ATM device 1a selects the lines A and B, which are routes connected to the ATM device 1b. The ATM device 1a selects a line which meets the requested band 100 Mbps from the selected routes, and sets the SVC call connection. However, each of the lines A and B has an idle band of 81 Mbps, and thus, the ATM device 1a cannot set the connection. That is, if the requested band is not available in any of the lines connected to the called ATM device, the ATM device 1a cannot set the connection.

The ATM device cannot set a connection of an SVC call if each of the lines does not meet the requested band although each of the lines has a respective idle band. Hence, even if the total of the idle bands meets the requested band, the ATM device cannot set a connection of an SVC call. Hence, the ATM device efficiently cannot utilize the line capacity.

SUMMARY OF THE INVENTION

It is an object of the present invention to provide an ATM device in which the above disadvantages are eliminated.

A more specific object of the present invention is to provide an ATM device capable of setting a connection even if each line connected to a called ATM device does not have an idle band as much as a requested band.

The above objects of the present invention are achieved by an ATM device which can be connected to an ATM network via lines, the ATM device comprising: a first part setting connections on the lines; and a second part moving a connection on a line to another line if a call setup requests a band greater than idle bands of the lines so that the band requested by the call setup can be set on the line from which the connection is moved.

The ATM device may further comprises a control information memory part which stores control information concerning states of the lines and states of connections set on the lines, the second part moves the connection by referring to the control information.

The ATM device may be configured so that the second part comprises: a connection search part which searches for a connection set on a line to be moved to another line by referring to control information concerning states of the lines and states of connections set on the lines; a line selecting part which selects a line to which the connection searched for should be moved by referring to the control information; and a rearrangement part which moves the connection searched for to the line selected by the line selecting part.

The ATM device may be configured so that the second part moves a connection on a line which has a minimum idle band after the connection is moved, as compared to the idle bands of the other lines.

The ATM device may be configured so that the connection search part searches for a connection on a line which has a minimum idle band after the connection is moved, as compared to the idle bands of the other lines.

The ATM device may be configured so that the second part moves a connection from a line which allows connections to be moved therefrom.

The ATM device may be configured so that: the control information memory part includes information indicating types of the connections; and the connection search part searches for a connection from a line which allows connections to be moved therefrom by referring to the types of the connections.

The ATM device may be configured so that the second part moves a connection from a line to another line which has a maximum idle band after receiving the connection moved, as compared to idle bands of the other lines by referring to the control information.

The ATM device may be configured so that the connection search part searches for a connection set on a line to be moved to another line which has a maximum idle band after receiving the connection moved, as compared to idle bands of the other lines by referring to the control information.

The ATM device may be configured so that the second part moves a connection from a line to another line in accordance with types of connections.

The ATM device may be configured so that:

the control information memory part includes information indicating types of the connections; and the line selecting part selects a line to which the connection should be moved by referring to the types of the connections.

The ATM device may be configured so that the second part moves a connection from a line to another line in accordance with priority assigned to the lines.

The ATM device may be configured so that:

the control information memory part includes information indicating priority assigned to the lines; and the line selecting part selects a line to which the connection should be moved by referring to the priority.

The ATM device may further comprise a periodic monitor part which periodically monitors states of the lines and states of connections set thereon and obtain information concerning the states thereof, the second part moving a connection set on a line to another line in accordance with the information obtained by the periodic monitor part.

The ATM device may be configured so that the second part periodically moves a connection on a line to another line in accordance with priority assigned to the lines.

The ATM device may be configured so that the second part periodically moves a connection on a line to another line so that idle bands of the lines are averaged.

The ATM device may be configured so that the second part moves a connection on a line from another line in accordance with information which is asked to be checked by a request of the call setup and prevents a connection which is not allowed to be moved to another line from being moved.

The ATM device may be configured so that the connection search part refers to information which is asked to be checked by a request of the call setup and prevents a connection which is not allowed to be moved to another line from being moved and searches for the line.

BRIEF DESCRIPTION OF THE DRAWINGS

Other objects, features and advantages of the present invention will become more apparent from the following detailed description when read in conjunction with the accompanying drawings, in which:

FIG. 9 is a diagram showing a band management table;

FIG. 10 is a diagram showing a connection management table;

FIG. 19 is a diagram of a version of the connection rearrangement process based on the periodic monitor process;

FIGS. 23, 24 and 25 show the contents of the band management tables and connection management tables related to the sequence shown in FIG. 21.

DESCRIPTION OF THE PREFERRED EMBODIMENTS

Figure 1:
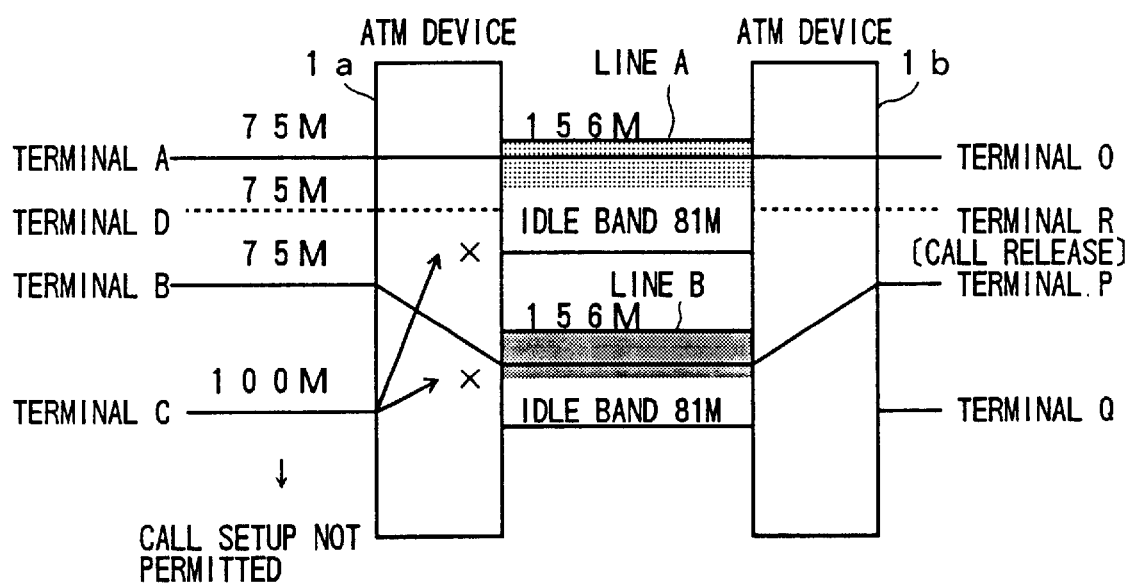
FIG. 1 is a block diagram showing a conventional connection setting process.
Figure 2:
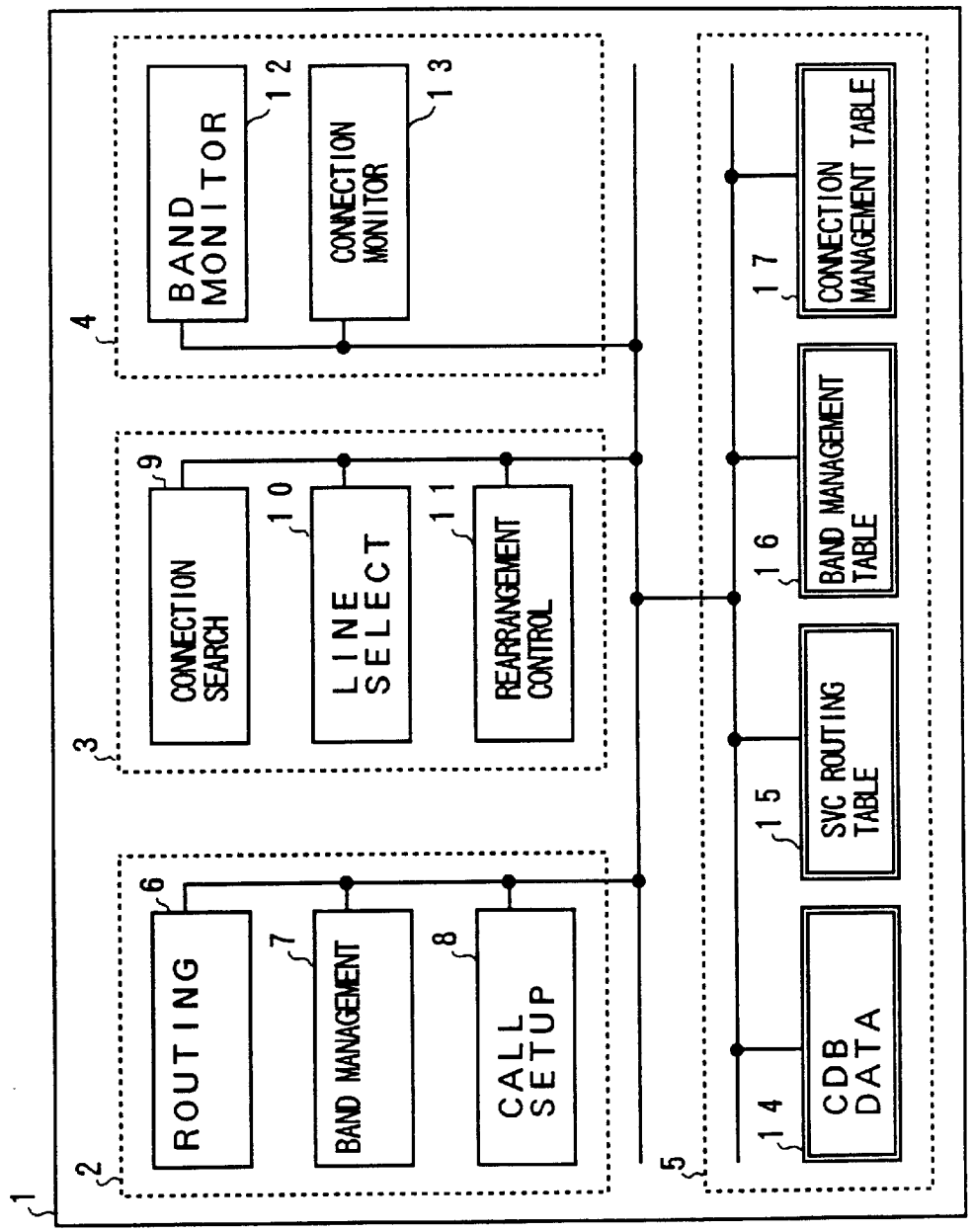
FIG. 2 is a block diagram of a principle of an embodiment of the present invention.

FIG. 2 is a block diagram of the principle of an ATM device according to the present invention. First, a description will be given of an ATM protocol of the ATM device with reference to FIG. 3.

An ATM protocol includes a physical layer 22, an ATM layer 23 and a call process layer 24. The physical layer 22 performs a control by hardware with respect to communication data on a transmission line 25. The call process 24 performs a software-based control. The communication data is segmented into 53-byte cells, which are transferred over the line 25 and are controlled by the ATM protocol. The cells received via the line 25 are physically interfaced with hardware of the ATM protocol 21 by the physical layer 22, and the original communication data is reproduced therefrom in the ATM layer 23. Then, a call connecting process for a terminal is carried out in the call process 24. Communication data sent from the call process 24 is segmented into ATM cells in the ATM layer 23, which cells are physical interfaced with the line 25 in the physical layer 22 and are transferred to the line 25.

In FIG. 2, the ATM device 1 includes a call setting part 2, a connection rearrangement part 3, and a periodic monitor part 4, and control data 5. The call setting part 2 sets a connection of an SVC call to a line of the ATM network in response to a call setup request from a terminal. The connection rearrangement part 3 rearranges connections if the call setup part 2 fails to set a connection. The periodic monitor part 4 periodically monitors the states of busy bands in the lines and the connection setting states thereon. The control data 5 includes information which efficiently enables the call setup process and connection rearrangement process. With the above structure, an SVC call connection can be set even if any line does not have a free band as much as a requested band defined in a call setup request.

The call setup part 2 includes a routing part 6, a band management part 7, and a call setup block 8. In response to a call setup request from a terminal, the routing part 6 receives searches for routes to a called terminal by referring to the identification number of the called terminal provided in the control data 5, and determines one of the routes. The band management part 7 ensures the requested band to the line of the route determined by the routing part 6. The call setup part 8 sets a connection in the requested band ensured by the band management part 7.

The connection rearrangement part 3 includes a connection search part 9, a line selecting part 10, and a rearrangement control part 11. If the call setup part 2 fails to set the connection, the connection search part 9 searches for a movable connection among the connections which are set in the route determined by the routing part 6. The line selecting part 10 determines the line to which the connection searched for by the connection search part 9 should be moved (rearranged). The rearrangement control block 11 actually executes the connection rearranging (moving) process.

The periodic monitor part 4 includes a band monitor part 12, and a connection monitor part 13, and issues a connection rearrangement request on the basis of the states of the lines. The band monitor part 12 periodically monitors the bands in use in the lines between the ATM devices and the states of idle bands therein. The connection monitor part 13 periodically monitors the states of the connections which are now set on the lines.

The control data 5 includes information concerning the setup request for the SVC call, such as CDB (Call Data Block) data 14, an SVC routing table 15, a band management table 16 and a connection management table 17. The CDB data 14 includes an identification number of a called terminal, a connection type and band information. The SVC routing table 15 stores the called terminal identification number and the line number which are linked together therein. The band management table 16 stores information concerning the lines, such as a line number, the connection type on the lines, the bands in use and idle bands. The connection management table 17 stores information concerning the connections, such as a VPI (Virtual Path Identifier) value, a VCI (Virtual Channel Identifier), the connection type, the used bands, rearrangement regulation information and the CDB number.

A description will now be given, with reference to FIG. 4, of a process executed by the ATM device 1 having the configuration shown in FIG. 2 at the time of requesting a call setup.

Figure 4:
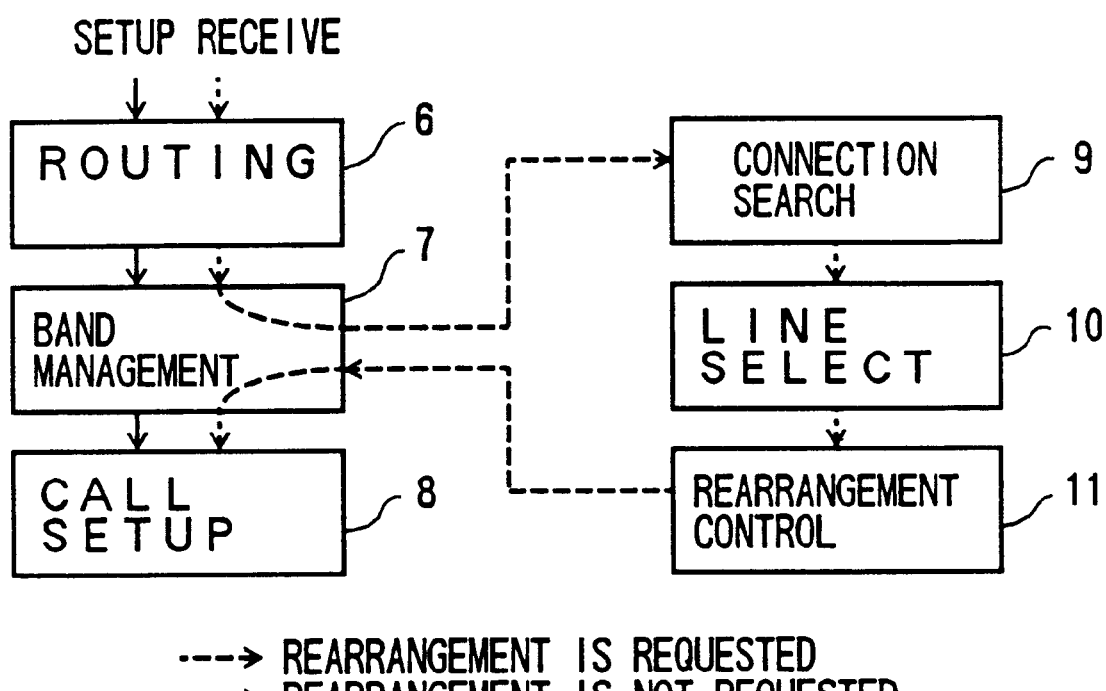
FIG. 4 is a block diagram of a process which is executed when a call setup is requested.

Referring to FIG. 4, if the connection rearrangement is not required, the routing part 6 receives a call setup request from a terminal, and determines a route in the ATM network from the identification number of the called terminal. Then, the band management part 7 selects one of the lines included in the route to which the connection for the SVC call can be set, and ensures the requested band on the selected line. The call setup part 8 sets the connection for the SVC call to the ensured band.

Figure 5:
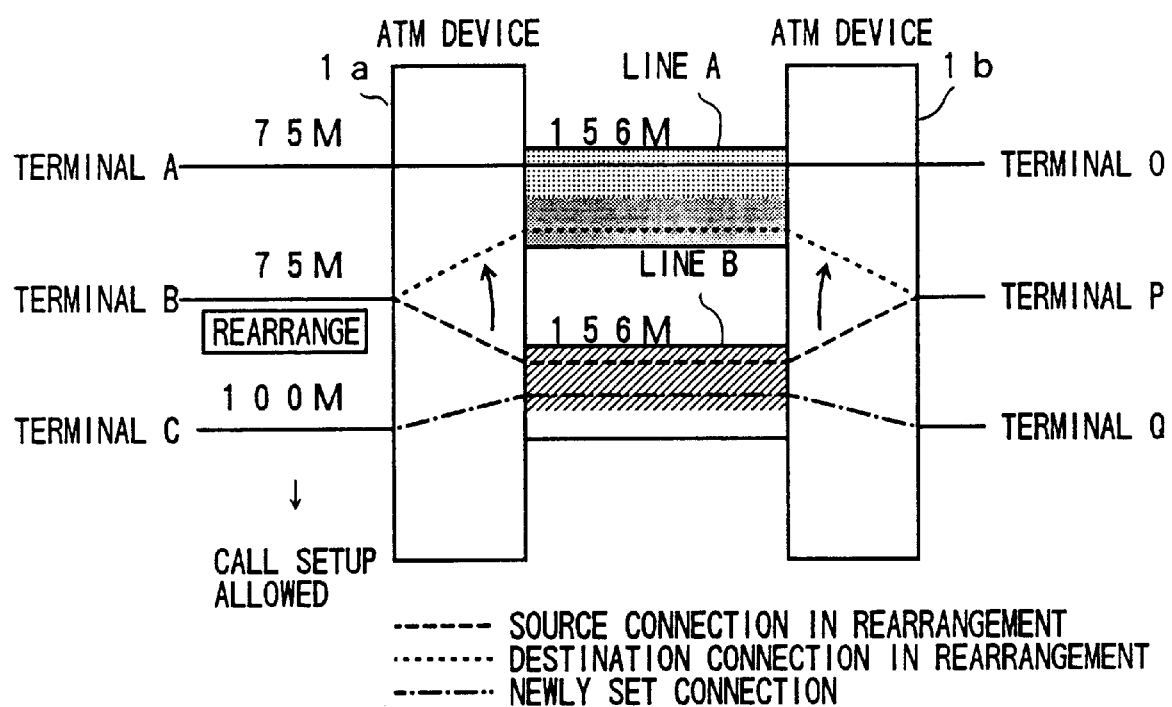
FIG. 5 is a block diagram of a connection rearrangement process.

A process which requires the connection rearrangement in the case of FIG. 4 will be described with reference to FIG. 5. FIG. 5 shows the following state. The ATM devices 1*a* and 1*b* are connected together by the lines A and B, each having a band of 156 Mbps. A connection having a band of 75 Mbps connecting the terminals A and O is set on the line A. A connection having a band of 75 Mbps connecting terminals B and P is set on the line B. The terminal C is requesting a connection to the terminal Q with a requested band of 100 Mbps.

The routing part 6 receives the call setup request from the terminal C, and determines, from the identification number of the called terminal Q, the lines A and B in a route in the ATM network connecting the terminals C and Q. Then, the band management part 7 searches for a line on which a connection for a SVC call requesting a band of 100 Mbps. In the present case, each of the lines A and B does not have an idle band as much as 100 Mbps. Thus, the band management part 7 sends the connection rearrangement request to the connection search part 9. In response to the above request, the connection search part 9 selects a movable connection which meets a given condition on the lines A and B, and selects, for instance, the connection on the line B. The line selecting part 10 determines that the connection searched for by the connection search part 9 should be moved or rearranged to the line A. The rearrangement control part 11 sets the connection to be moved from the line B on the line A selected by the line selecting part 10. When the above rearrangement is completed, the rearrangement control part 11 sends a rearrangement success notification to the band management part 7. The band management part 7 receives the above notification, the band management part, and the call setup part 8 sets the connection for the SVC call on the line B, so that the terminals C and Q are connected together.

A description will now be given, with reference to FIGS. 6, 7 and 8, of a process executed by the ATM device 1 at the time of requesting a call setup.

Figure 6:
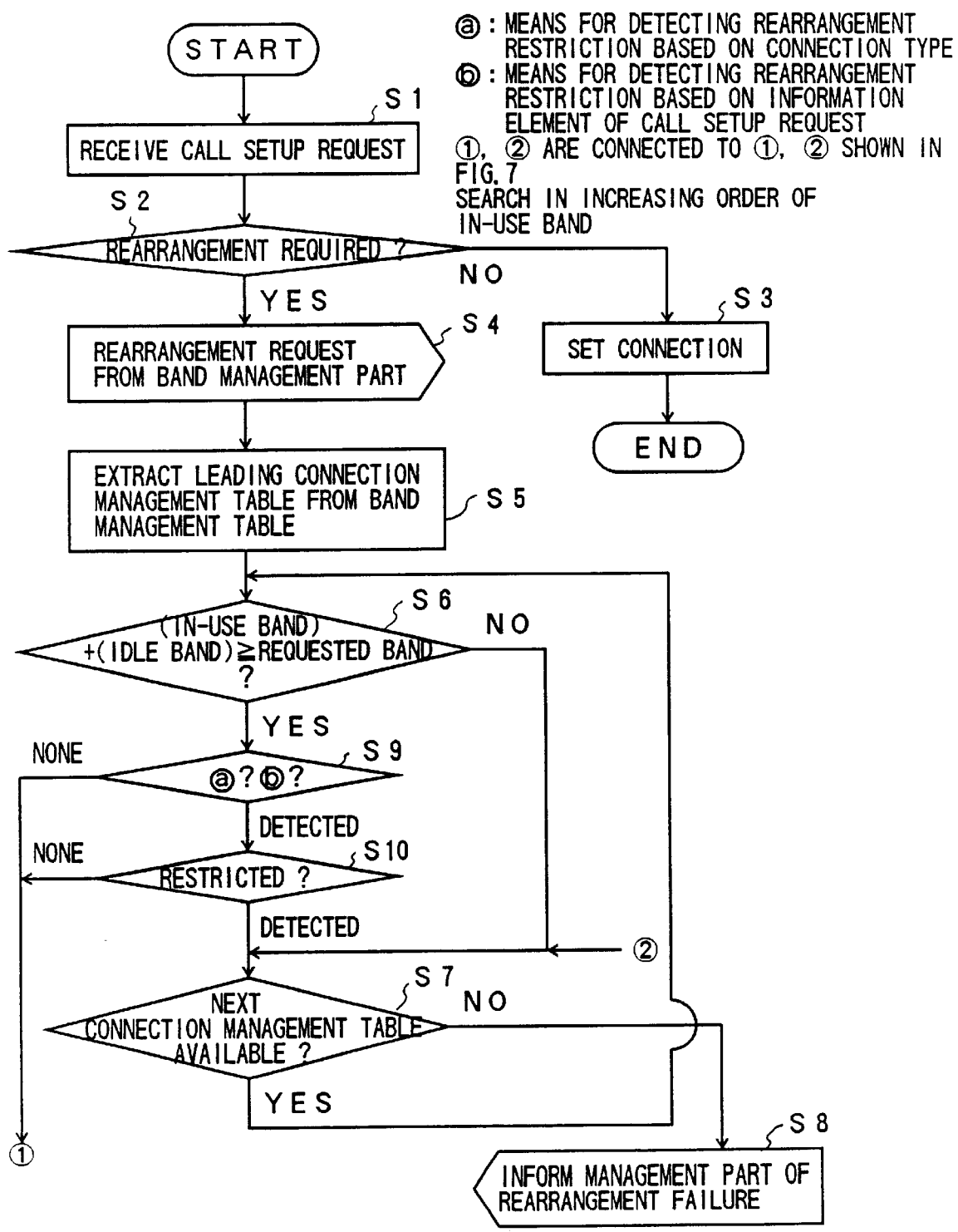
FIG. 6 is a flowchart of a first part the connection rearrangement process.

The routing part 6 of the ATM device 1 receives the call setup request from a terminal, and determines the route of the ATM network from the identification number of the called terminal (step S1 shown in FIG. 6). The band management part 7 extracts, from the lines included in the route, all lines on which a connection for the SVC call and determines whether there is a line having an idle band equal to or more than the requested band (step S2). When the result of step S2 is affirmative, in other words, when the connection rearrangement is not required, the band management part 7 ensures the requested band. The call setup part 8 sets a connection for the SVC call to the ensured band in accordance with the same process as that of the ATM device (step S3). If it is determined, at step S2, that there are no lines each having an idle band more than the requested band, the band management part 7 requests the connection rearrangement request to the connection search part 9 (step S4).

Then, the connection search part 9 extracts, with respect to each of all the lines included in the route in the ATM network determined by the routing part 6, a leading point of the connection management table 17 from the band management table 16 configured as shown in FIG. 9, and retrieves the connection management table 17 configured as shown in FIG. 10 (step S5).

The connection search part 9 searches all the connection management tables 17 of all the lines in the determined ATM route, and determines whether there is a connection to be rearranged or moved by using a next connection management table point provided in each of the connection management tables 17 (step S6). In the above determining process, all the connections are checked in a given sequence, for example, in the increasing order of the band of the connection.

Figure 11:
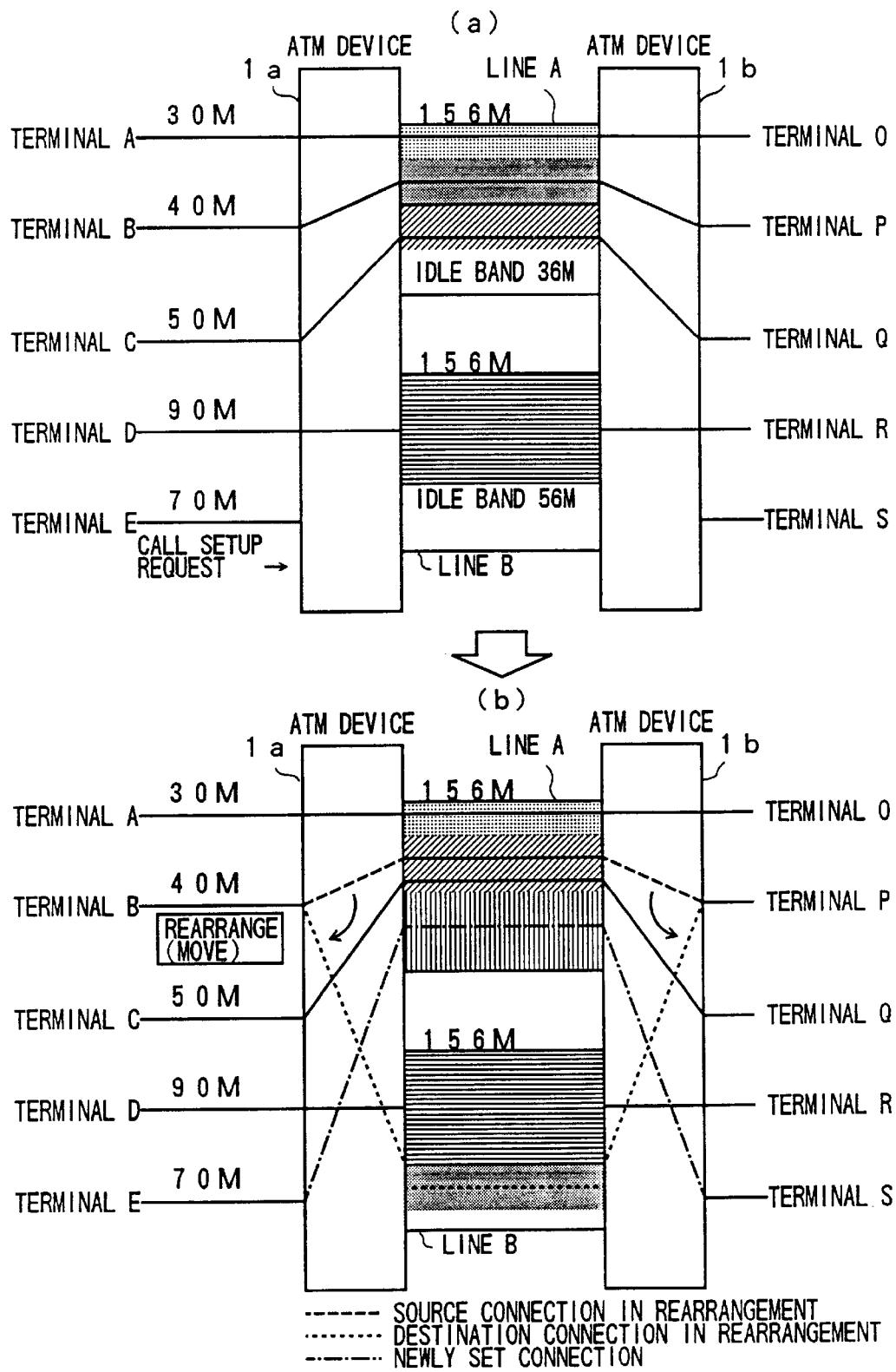
FIG. 11 is a block diagram of a version of the connection rearrangement process directed to minimizing an idle band of a line from which a connection should be moved to another line.

The connection rearrangement can be carried out in accordance with given priority. The above checking sequence is an example of the priority. By way of example, the connection rearrangement based on priority directed to minimizing the remaining idle band after the rearrangement will be described with reference to FIG. 11. Part (a) of FIG. 11 shows a state in which the ATM devices 1a and 1b are connected together by the lines A and B each having a band of 156 Mbps. As shown in FIG. 11(*a*), three connections are set on the line A. More particularly, the first connection connects the terminals A and O together and has a band of 30 Mbps. The second connection connects the terminals B and P together and has a band of 40 Mbps. The third connection connects the terminals C and Q together, and has a band of 50 Mbps. In FIG. 11(*a*), one connection is set on the line B. This connection connects the terminals D and R together, and has a band of 90 Mbps. Further, the terminal E requests a connection to the terminal S with a band of 70 Mbps.

The connection search part 9 adds the band 30 Mbps of the in-use connection between the terminals A and O on the line A and the band 36 Mbps of the idle band of the line A, and compares the sum 66 Mbps with the requested band 70 Mbps. The total band is less than the requested band 70 Mbps, and thus the connection between the terminals E and S cannot be set even if the connection between the terminals A and O on the line A is rearranged or moved. Hence, the connection between the terminals A and O is recognized as being an out-of-rearrangement connection (step S6, NO).

Next, the connection search part 9 extracts the next connection management table 17 by referring to the connection management table point in the currently processed connection management table 17 (step S7). If the next connection management table pointer is not defined in the present connection management table 17, the connection search part 9 sends a rearrangement failure notification to the band management part 7 (step S8, NO). If the next connection management table pointer is available (step S7, YES), the connection search part 9 sums the in-use band 40 Mbps of the connection between the terminals B and P on the line A shown in FIG. 3(*a*) and the idle band 36 Mbps, and compares the total 76 Mbps with the requested band 70 Mbps. In this case, the total is more than the requested band 70 Mbps. Hence, if the above connection between the terminals B and P is moved, the requested connection between the terminals E and S can instead be set on the line A. Hence, the connection between the terminals B and P can be recognized as being a movable connection (step S6, YES). In the above-mentioned manner, all the lines included in the ATM network are checked, and the connection which provides the remaining minimum idle band after the rearrangement is searched for.

Figure 3:
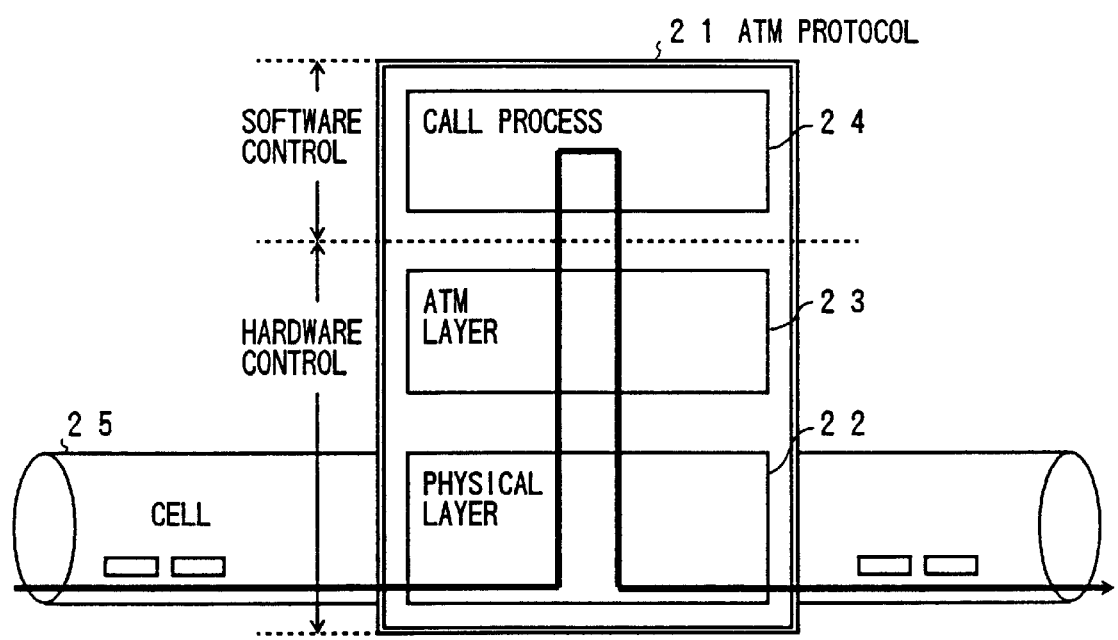
FIG. 3 is a block diagram of an outline of an ATM protocol.

If a plurality of movable connections exist as shown in FIG. 3, the connection search part 9 selects the connection which provides the minimum idle band after the rearrangement, so that the ATM device 1 can rearrange the connections so as to minimize uselessness on the line.

Then, the connection search part 9 determines whether there is provided means for retrieving a rearrangement restriction defined based on the connection type or means for retrieving a rearrangement restriction based on an information element included in the call setup request (step S9).

If it is determined, at step S9, that there is no means, the connection search part 9 finally determines the connection which provides the minimum idle band after the rearrangement as being the connection to be moved, and terminates the search process (the above is defined as a first method for searching for a movable connection in the rearrangement).

If it is determined, at step S9, that there is at least one of the above two means, the process proceeds with step S10. For example, if it is determined that there is provided the means for searching for the rearrangement restriction based on the connection type, the connection search part 9 determines, at step S10, whether there is any rearrangement restriction to the connection which provides the minimum idle band after the rearrangement and is obtained at step S6.

A description will now be given, with reference to FIG. 4, of the method for searching for the rearrangement restriction based on the connection type. FIG. 4(*a*) shows a state in which the ATM devices 1a and 1b are connected together by the lines A and B each having a band of 156 Mbps. Three connections are set on the line A. More particularly, the first connection is provided between the terminals A and O on the line A and has a band of 30 Mbps (type: CBR). The second connection is provided between the terminals B and P and has a band of 40 Mbps (type : VBR). The third connection is provided between the terminals C and Q and has a band of 50 Mbps (type: UBR). One connection is provided between the terminals D and R on the line B and has a band of 100 Mbps (type: VBR). The terminal E is requesting a connection to the terminal S with a band of 60 Mbps.

It will be noted that "CBR", "VBR" and "UBR" are respectively abbreviations of Continuous Bit Rate, Variable Bit Rate and Unspecified Bit Rate and types of connections. The CBR type is a connection type in which cells are transferred at a constant rate. A and is assigned to the CBR type and has priority over the other types. The VBR type is a connection type in which cells are transferred at a variable rate. A band is assigned to the VBR type and has a cell transfer delay and discarded ratio greater than those of the CBR type. The UBR type does not specify the bit rate, and a band is not allowed. Hence, the UBR does not ensure the quality. The connection search part 9 checks all the lines included in the route connecting the ATM devices in the same steps as the aforementioned steps 1 to 7. Hence, the connection which connects the terminals A and O together and provides the minimum idle band can be determined.

Figure 12:
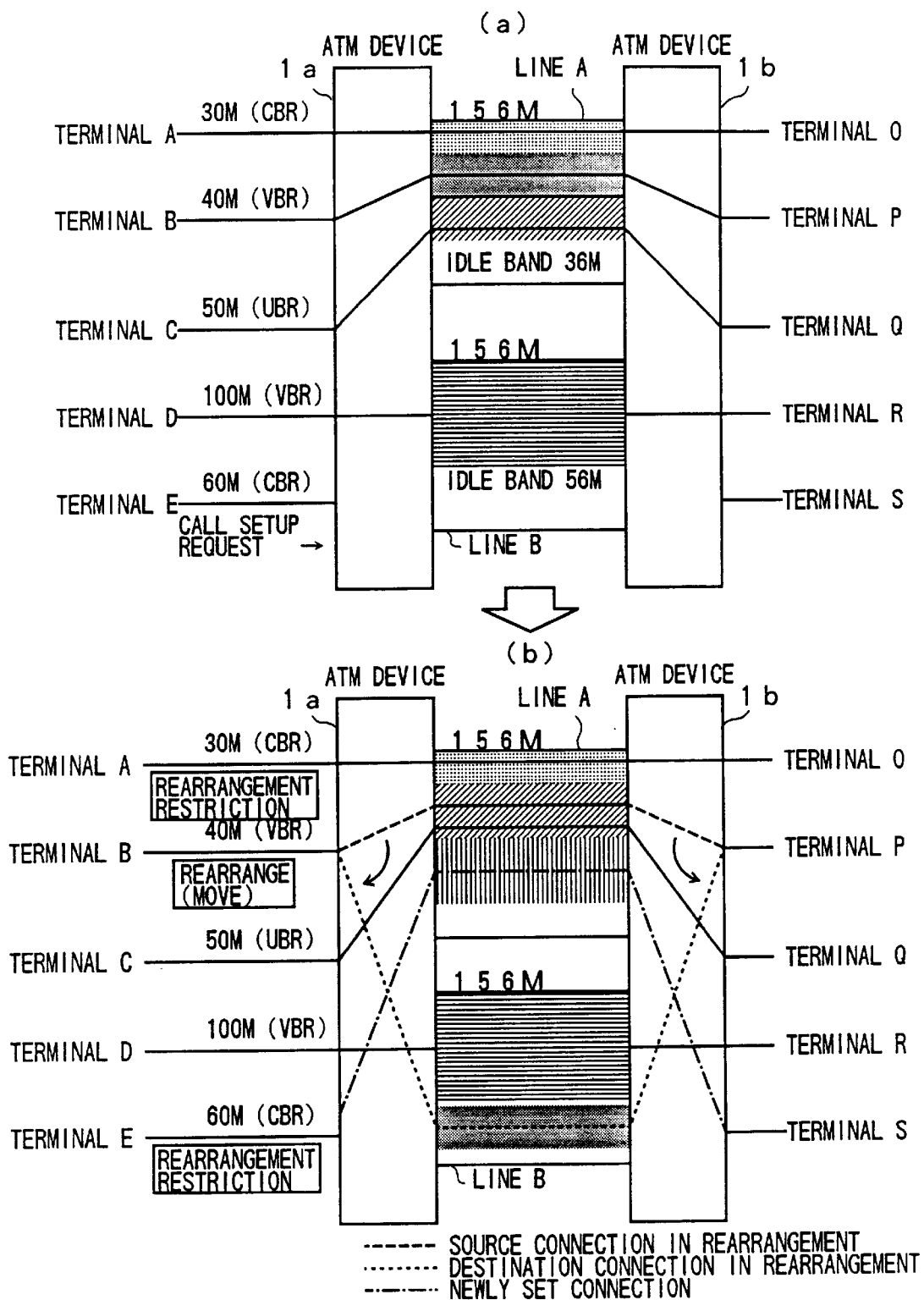
FIG. 12 is a block diagram of another version of the connection rearrangement process directed to moving a connection on a line to another line in accordance with types of connections.

The connection search part 9 extracts, through means for searching for the rearrangement restriction based on the connection type, the connection between the terminals A and O from the connection management table 17. The rearrangement of the CBR type extracted is restricted, as shown in FIG. 12(*b*), and the result of the step S10 determination is NO. The connection search part 9 checks all the lines included in the route connecting the ATM devices in the ATM network in the same steps as the aforementioned steps 1 to 7. Hence, the connection which connects the terminals B and P together and provides the second minimum idle band can be determined, while the connection between the terminals A and O has the first minimum idle band.

The connection search part 9 extracts, through means for searching for the rearrangement restriction based on the connection type, the connection type from the connection management table 17 corresponding to the connection connecting the terminals B and P together. In the case shown in FIG. 12(*b*), the extracted connection type VBR is out of the rearrangement regulation (the result of step S10 is No). Thus, the connection searching part 9 recognizes the connection between the terminals B and P as being a movable connection for rearrangement, and terminates the search process (the above is defined as a second method for searching for a movable connection in the rearrangement).

If a plurality of movable connections exist, the connection search part 9 determines, each of the movable connections, whether it is of the type subjected to or not to the restriction, and selects the movable connection. Hence, the ATM device 1 can rearrange the connections so that the connections required to have high quality are restricted to be rearranged and a degradation due to the rearrangement can be prevented.

If the result of step S9 is YES and the connection search part 9 has means for searching for the rearrangement restriction instructed by an information element included in the call setup request, the connection search part 9 searches for a restriction to the connection which provides the minimum idle band after the rearrangement obtained at step S6 (step S10).

Figure 13:
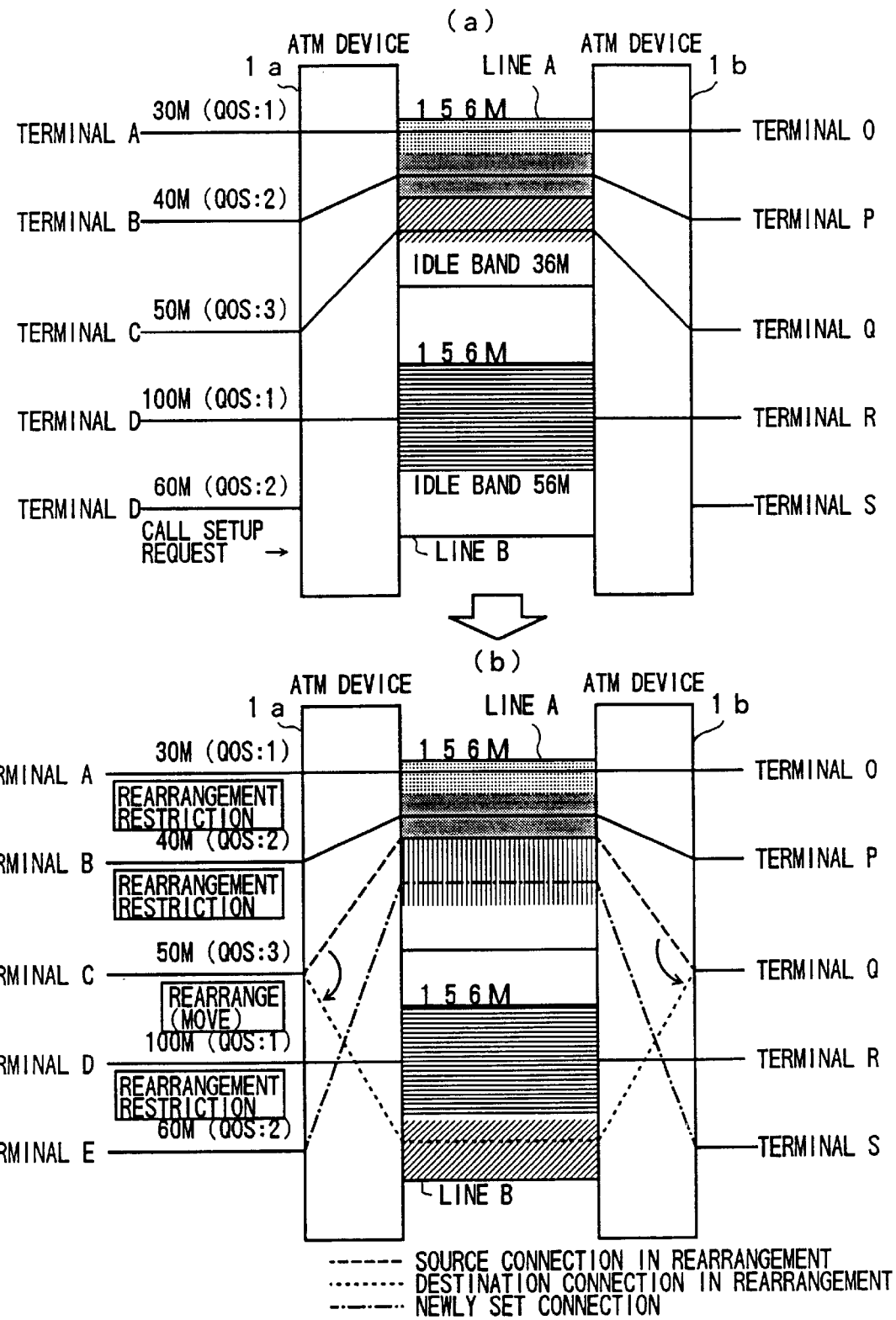
FIG. 13 is a block diagram of yet another version of the connection rearrangement process in which information restricting a connection rearrangement is included in a call setup request.

The method for searching for the rearrangement restriction indicated by the information element of the call setup request will be described with reference to FIG. 13. FIG. 13 shows a state in which the ATM devices 1a and 1b are connected together by the lines A and B, each having a band of 156 Mbps. Three connections are set on the line A. More particularly, the first connection set on the line A connects the terminals A and O and has a band of 30 Mbps (QOS:1). The second connection connects the terminals B and P and has a band of 40 Mbps (QOS:2). The third connection connects the terminals C and Q and has a band of 50 Mbps (QOS:1). A connection connecting the terminals D and R and having a band of 100 Mbps is set on the line B (QOS:1). Further, the terminal E is requesting a connection to the terminal S with a band of 60 Mbps.

The above QOS attached to each connection is an abbreviation of Quality Of Service, and the values 1, 2 and 3 of the QOS respectively indicate communication qualities related to at the time of the ATM transfer such as a cell discard and a delay. The value 1 of the QOS indicates the highest-quality connection. The connection search part 9 checks all the lines included in the route in the ATM network connecting the ATM terminals by the same steps as the aforementioned steps 1 to 7. Hence, the connection which connects the terminals A and O together and provides the minimum idle band can be determined at the time of setting a connection by a call setup request after the rearrangement can be determined.

The connection search part 9 checks, through means for searching for the rearrangement restriction based on the connection type, whether the call setup request includes the rearrangement restriction by referring to the connection management table 17 corresponding to the connection between the terminals A and O. As shown in FIG. 13(*b*), the rearrangement of the connection connecting the terminals A and O is restricted (the result of step S10 is YES). Thus, the connection searching part 9 checks all the lines included in the route connecting the ATM devices by the same steps as the aforementioned steps 1 to 7. Hence, the connection which connects the terminals B and P together and provides the second minimum idle band can be determined at the time of setting a connection by a call setup request after the rearrangement can be determined, while the connection between the terminals A and O has the first minimum idle band.

The connection search part 9 checks, through means for searching for the rearrangement restriction indicated by the information element included in the call setup request, whether the call setup request includes the rearrangement restriction by referring to the connection management table 17 corresponding to the connection between the terminals B and P. As shown in FIG. 13(*b*), the rearrangement of the connection connecting the terminals B and P is restricted (the result of step S10 is YES). Hence, the connection search part 9 checks again all the lines included in the route connecting the ATM devices by the process including the aforementioned steps 1 to 7. Hence, the connection which connects the terminals B and P together and provides the second minimum idle band at the time of setting a connection by a call setup request after the rearrangement can be determined, while the connection between the terminals A and O has the first minimum idle band.

The connection searching part 9 checks, through means for searching for the rearrangement restriction indicated by the information element of the call setup request, whether the call setup request includes the rearrangement restriction by referring to the connection management table 17. The connection connecting between the terminals C and Q is out of the rearrangement restriction (the result of step S10 is NO), as shown in FIG. 13(*b*). Hence, the connection search part 9 recognizes the connection between the terminals C and Q as being a removable connection in the rearrangement, and terminates the search process (the above is defined as a third method for searching for a movable connection in the rearrangement).

By using the ATM device 1, the call setup request from the terminal can include a quality insurance request as an information element. Further, if there are a plurality of movable connections for the rearrangement, the ATM device 1 does not rearrange the connections having the restrictions.

In the case where the connection search part 9 includes both the means for searching for the rearrangement restriction based on the connection type and the means for searching for the rearrangement restriction indicated by the information element of the call setup request, the connection search part 9 searches for the rearrangement restriction based on the connection type as shown in FIG. 12, and then searches for the restriction rearrangement indicated by the information element of the call setup request shown in FIG. 13 (step S10). The structures and functions of the above two means have been explained previously. The connection search part 9 sequentially executes step S10 and completes the search operation (the above method using the two means is defined as a fourth method for searching for a movable connection in the rearrangement).

Figure 14:
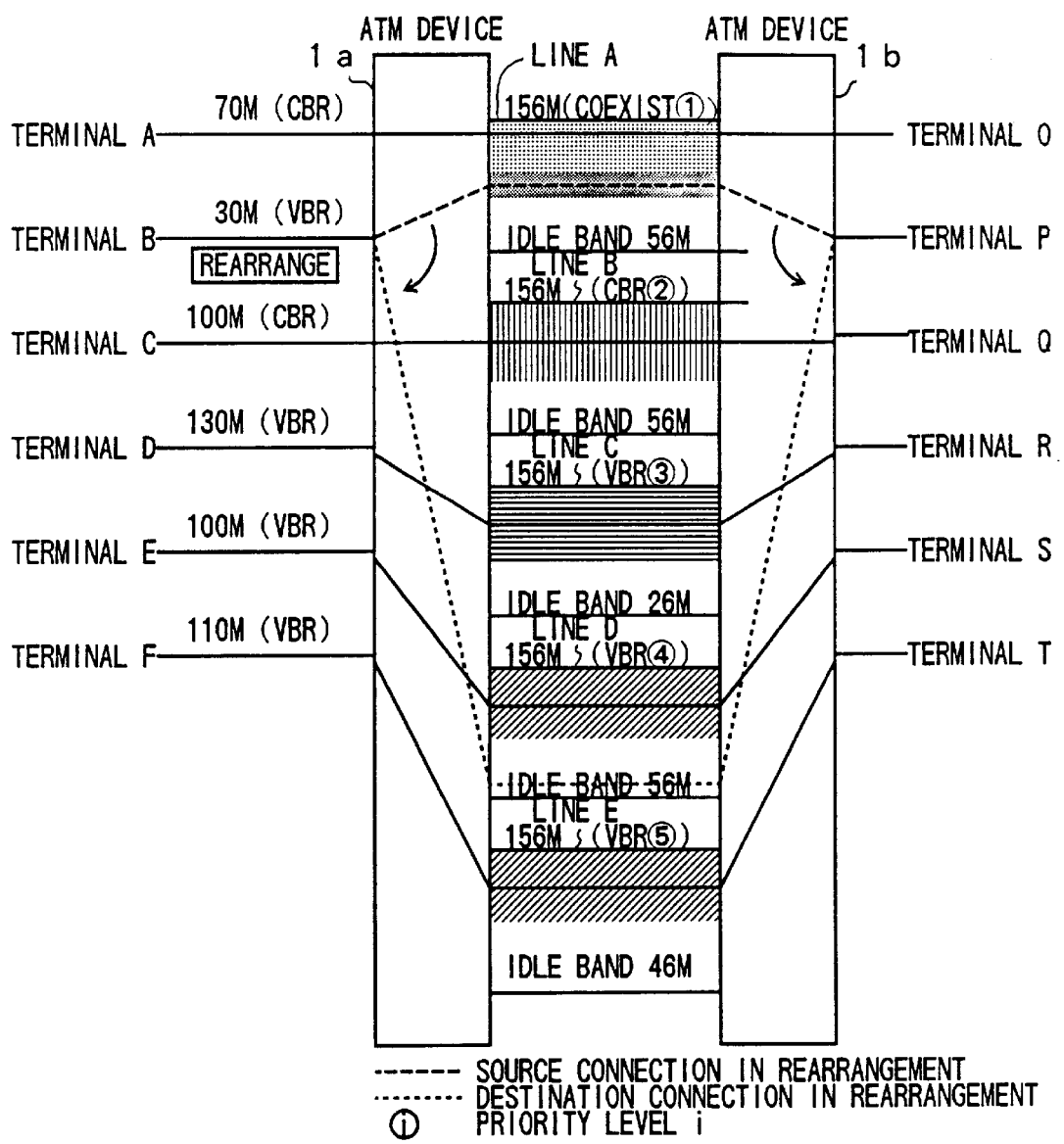
FIG. 14 is a block diagram of a further version of the connection rearrangement process directed to selecting a line having a maximum idle band after the rearrangement.
Figure 15:
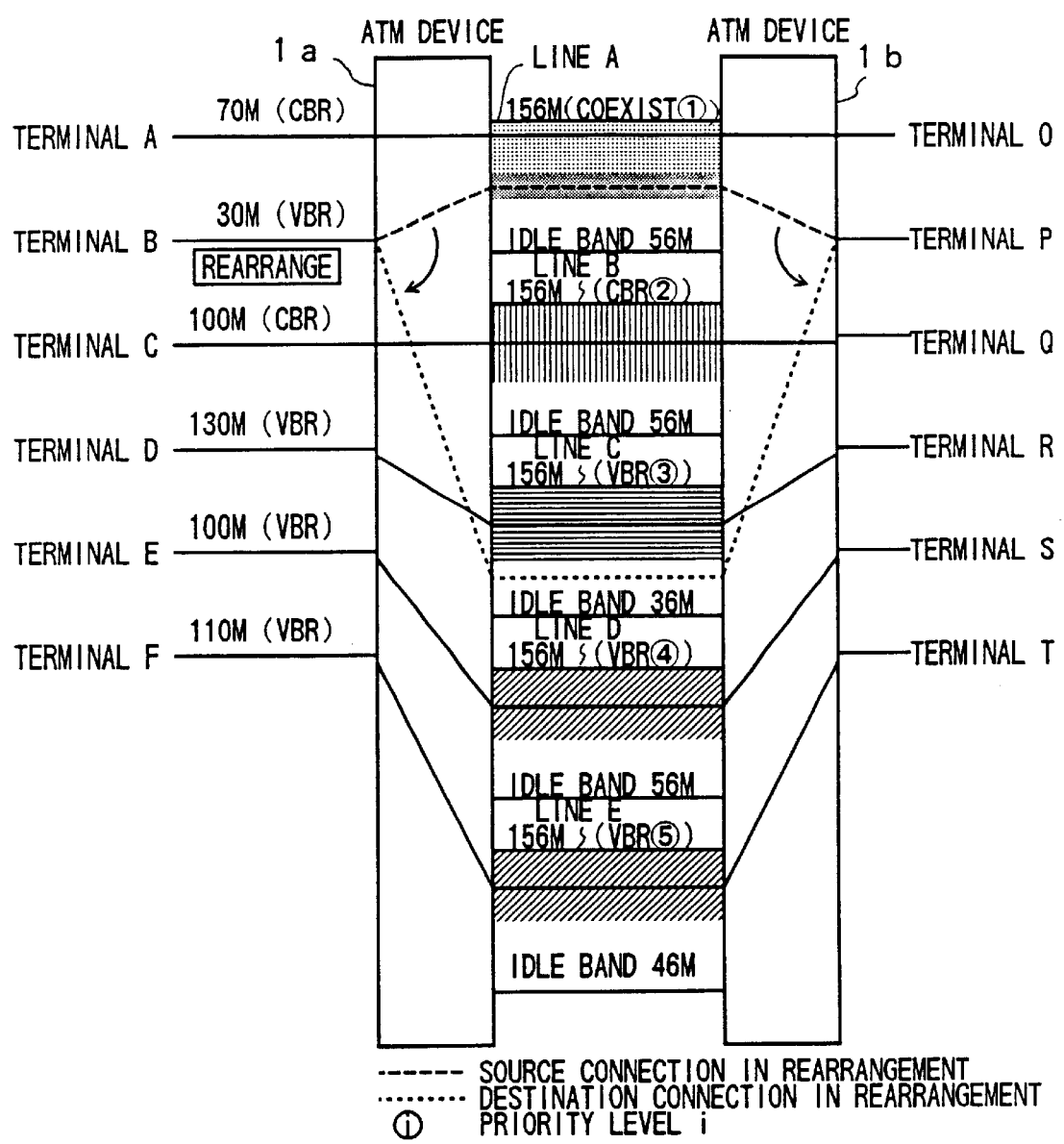
FIG. 15 is a block diagram of another version of the connection rearrangement process in accordance with priority assigned to the lines.

It will now be assumed that one of the above first through fourth methods for searching for a movable connection in the rearrangement is used and the connection search part 9 finds a connection connecting the terminals B and P as shown in FIGS. 14 and 15. The line selecting part 10 extracts the CDB number from the connection management table 17 corresponding to the connection connecting the terminals B and P, and accesses the CDB data 14 shown in FIG. 16 by using the extracted CDB number. Hence, the identification number of the called terminal can be obtained. Then, the line selecting part 10 searches the SVC routing table 15 shown in FIG. 17 by using the obtained identification number of the called terminal, so that all line tables linked with the identification number of the called terminal can be obtained (step S21 shown in FIG. 7).

Then, the line selecting part 10 determines which line should be selected to accommodate the connection to be moved. There are provided two criteria used for the line selection. The first criterion is to select the line which has the maximum idle area if the above line accommodates the connection to be moved. The second criterion is to select the line in accordance with given priority.

A description will now be given, with reference to FIG. 14, of a case where the first criterion for the line selection is employed. FIG. 14 shows that the ATM terminals 1a and 1b are connected together by lines A, B, C, D and E, each having a band of 156 Mbps. The line A allows any connection type and has a priority level of 1. The line B has the CBR type and a priority level of 2. The line C has the VBR type and a priority level of 3. The line D has the VBR type and a priority level of 4. The line E has the VBR type and has a priority level of 5.

On the line A are set a 70 Mbps connection of the CBR type connecting the terminals A and O, and a 30 Mbps connection of the VBR type connecting the terminals B and P. On the line B is set a 100 Mbps connection of the CBR type connecting the terminals C and Q. On the line C is set a 130 Mbps connection of the VBR type connecting the terminals D and R. A 100 Mbps connection of the VBR type connecting the terminals E and S is set on the line D. A 110 Mbps connection of the VBR type connecting the terminals F and T is set on the line E. The connection between the terminals B and P on the line A should be moved or rearranged so that the maximum band can be obtained in the line which accommodates the connection to be moved after the rearrangement.

Figure 17:
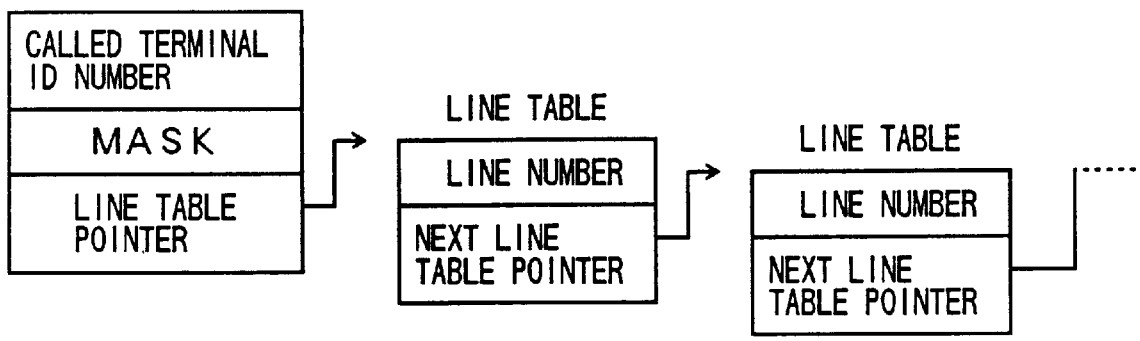
FIG. 17 shows an SVC routing table.

The line selecting part 10 checks the line tables in the order of lines B, C, D and E and determines whether these lines can accommodate the connection to be moved in the rearrangement. The line tables are linked as shown in FIG. 17 and are extracted at step S21 shown in FIG. 7. In the above checking and determining process, the line selecting part 10 extracts the connection type from the band management table 16 corresponding to the line B, and compares the connection type VBR of the connection connecting the terminals B and P with the extracted connection type (step S22). Since the line B has the connection type CBR, the result of step S22 is NO. Thus, the line selecting part 10 determines whether the next line table is available at step S23, and extracts it if the result is affirmative.

In order to determine whether the line C can accommodate the connection to be moved, the line selecting part 10 extracts the connection type from the band management table 16 corresponding to the line C, and compares the connection type VBR of the connection connecting the terminals B and P with the extracted connection type (step S22). Since the line C has the connection type VBR, the line selecting part extracts the idle band of the line C from the band management table 16, and determines whether the extracted idle band is equal to or greater than the band of the connection connecting the terminal B and P (step S24). The idle band of the line C is equal to 26 Mbps, and thus the line selecting part 10 checks whether the next line table is available (step S23). In the present example, the line selecting part 10 extracts the line table of the line D (step S23, YES).

In order to determine whether the line D can accommodate the connection to be moved, the line selecting part 10 extracts the connection type from the band management table 16 corresponding to the line D, and compares the connection type VBR of the connection connecting the terminals B and P with the extracted connection type (step S22). Since the line D has the connection type VBR, the line selecting part 10 refers to the idle band of the line D in the band management table 16, and discerns whether the idle band of the line D is equal to or greater than the band of the connection connecting the terminals B and P (step S24). Since the line D has an idle band of 56 Mbps, the result of step S24 is YES, and thus the line selecting part 10 determines whether the line D has the maximum idle band after the rearrangement (step S25). At the present time, the line D has the maximum idle band after the rearrangement, and thus, the line selecting part 10 provisionally registers the line D as the destination line for the rearrangement (step S26). Further, the line selecting part 10 determines whether the method for selecting the destination line being executed is based on either the first criterion or the second criterion (step S27). In the present example, the first criterion is employed, and thus, the line selecting part 10 checks whether the next line table is available (step S23). Then, the line table of the line E is extracted as the next line table (step S23, YES).

In order to determine whether the line E can accommodate the connection to be moved, the line selecting part 10 extracts the connection type from the band management table 16 corresponding to the line E, and compares the connection type VBR of the connection connecting the terminals B and P with the extracted connection type (step S22). Since the line E has the connection type VBR, the line selecting part 10 refers to the idle band of the line E in the band management table 16, and discerns whether the idle band of the line E is equal to or greater than the band of the connection connecting the terminals B and P (step S24). Since the line E has an idle band of 46 Mbps, the result of step S24 is YES, and thus the line selecting part 10 determines whether the line E has the maximum idle band after the rearrangement (step S25). Since the line D has the greater idle band than that of the line D after the rearrangement, the line selecting part 10 maintains the line D as the destination line for the rearrangement (step S26). Further, the line selecting part 10 checks whether the next line table is available (step S23). In the present example, there is no longer any line table extracted at step S21, and the result of step S23 is NO. The line selecting part 10 finally determines that the line D is the destination line to which the connection should be moved. If it is determined, as step S28 that no line to which the connection should be moved is available, the process starting from step 7 is executed again.

When the line to which the connection should be moved from another line is selected, the line selecting part 10 can determine the line which has the maximum idle band after the rearrangement. Hence, the traffic in all the lines connecting the ATM devices can be averaged and the qualities of all the lines can be maintained in the stable state.

Next, a description will now be given, with reference to FIG. 15, of a case where the aforementioned second criterion for the line selection is employed. The second criterion is to select the line to which the connection should be moved in accordance with the priority given to the respective lines.

Referring to FIG. 15, the ATM devices 1a and 1b are connected together through the lines A, B, C, D and E, each having a band of 156 Mbps. The line A allows any connection type and has a priority level of 1. The line B has the CBR type and a priority level of 2. The line C has the VBR type and a priority level of 3. The line D has the VBR type and a priority level of 4. The line E has the VBR type and has a priority level of 5.

On the line A are set a 70 Mbps connection of the CBR type connecting the terminals A and O, and a 30 Mbps connection of the VBR type connecting the terminals B and P. On the line B is set a 100 Mbps connection of the CBR type connecting the terminals C and Q. On the line C is set a 120 Mbps connection of the VBR type connecting the terminals D and R. A 100 Mbps connection of the VBR type connecting the terminals E and S is set on the line D. A 110 Mbps connection of the VBR type connecting the terminals F and T is set on the line E. The connection between the terminals B and P on the line A should be moved or in accordance with the priority assigned to the respective lines.

The line selecting part 10 checks all the line tables extracted at step S21 in the decreasing order of priority, for example, the lines B, C, D and E as shown in FIG. 15.

In order to determine whether the line B can accommodate the connection connecting between the terminals B and P, the line selecting part 10 extracts the connection type from the band management table 16 corresponding to the line B, and compares the connection type VBR of the connection connecting the terminals B and P with the extracted connection type (step S22). Since the line B has the connection type CBR, the result of step S22 is NO. Thus, the line selecting part 10 determines whether the next line table is available at step S23, and extracts it if the result is affirmative.

In order to determine whether the line C can accommodate the connection to be moved, the line selecting part 10 extracts the connection type from the band management table 16 corresponding to the line C, and compares the connection type VBR of the connection connecting the terminals B and P with the extracted connection type (step S22). Since the line C has the connection type VBR, the line selecting part 10 extracts the idle band of the line C from the band management table 16, and determines whether the extracted idle band is equal to or greater than the band of the connection connecting the terminal B and P (step S24). The idle band of the line C is equal to 36 Mbps, and thus the line selecting part 10 checks whether the next line table is available (step S25). Since the line C has the maximum idle band after the rearrangement (the result of step S25 is YES), the line selecting part 10 determines that the line C is the destination line in the rearrangement (step S26). Further, the line selecting part 10 determines whether the current method for selecting the line to which the connection between the terminals B and P should be moved is based on the first criterion or the second criterion (step S27). In the present example, the second criterion is employed, and thus, the line selecting part 10 determines that the destination line in the rearrangement is the line C (the result of step S28 is YES). If no line is obtained at step S28, the process starting from step 7 is carried out again. As shown in FIG. 15, the lines D and E have priority levels lower than the priority level of the line C, and are not determined as being the destination line.

When the second criterion directed to the priority assigned to the respective lines is employed, the line selecting part determines the destination line in accordance with the priority. Hence, the degree of freedom in selection of the line can be improved. For example, it is possible to maintain the line having a low priority level in an idle or substantially idle state. Thus, if a call setup request requesting a large band is issued, the setting of a connection can be done without rearranging the connection.

After the line selecting part 10 informs the rearrangement control part 11 of the destination line in the rearrangement, which is determined based on the first criterion or the second criterion, the rearrangement control part 11 executes the connection rearrangement (movement) process.

Figure 16:
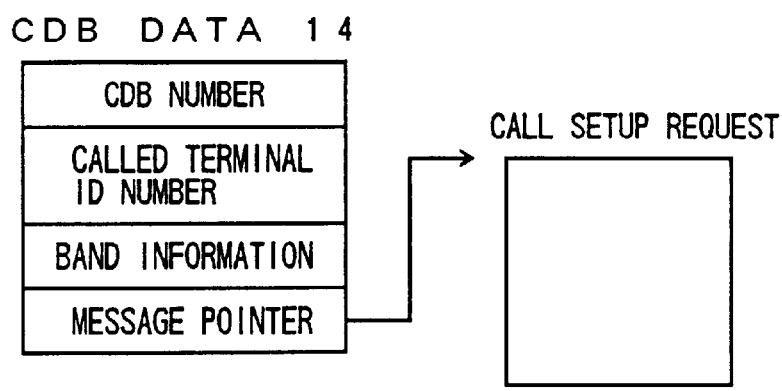
FIG. 16 shows a CDB data.

The rearrangement control part 11 extracts the CDB number from the connection management table 17 corresponding to the connection to be moved, and sends a call setup request as shown in FIG. 16 from the CDB data corresponding to the CDB number to the remote terminal, so that the remote terminal is requested to set up a call (step S31). The call setup is successful (step S32), the rearrangement control part 11 updates the band management table 16 of the destination line and performs the setting of the connection management table 17. Then, the rearrangement control part 11 releases the connection which is set on the source line in the rearrangement (step S33), and makes a connection on the destination line (step S34). Further, the rearrangement control part 11 updates the band management table 16 of the source line in the rearrangement and deletes the connection management table 17 thereof. Then, the rearrangement control part 11 requests the remote terminal to release the call on the source line in the rearrangement (step S35), and informs the band management part 7 that the rearrangement is successful (step S36). If the call setup to the remote terminal fails (step S38), the rearrangement control part 11 informs the connection search part 9 of the call setup failure. Hence, the connection to be move is searched for again starting from step S7.

When the band management part 7 receives the notification indicating that the rearrangement is successful, the call setup part 8 can set an SVC call connection to the ensured band of the source line in the rearrangement (step S37).

Figure 7:
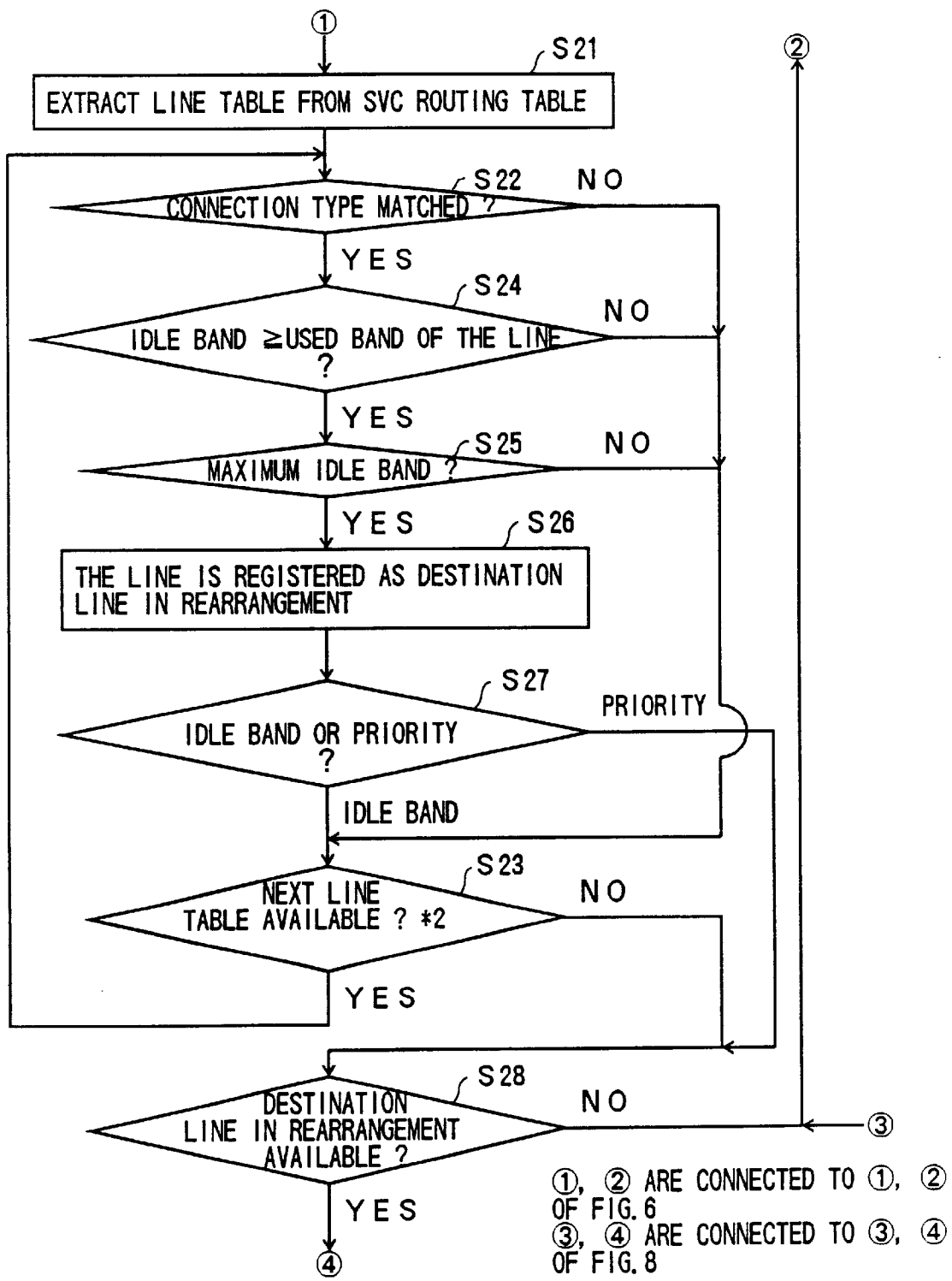
FIG. 7 is a flowchart of a second part of the connection rearrangement process.
Figure 8:
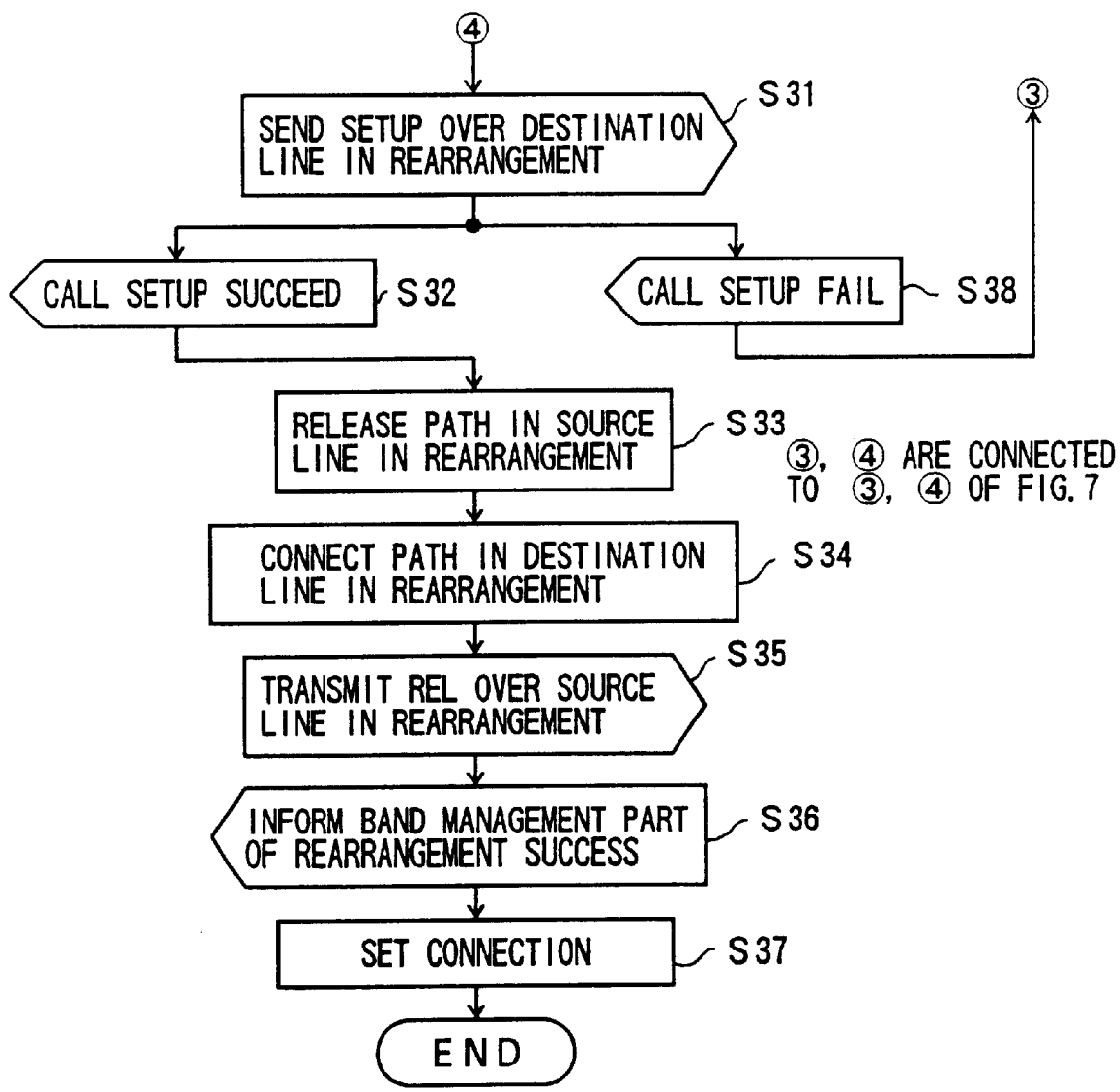
FIG. 8 is a flowchart of a third part of the connection rearrangement process.
Figure 18:
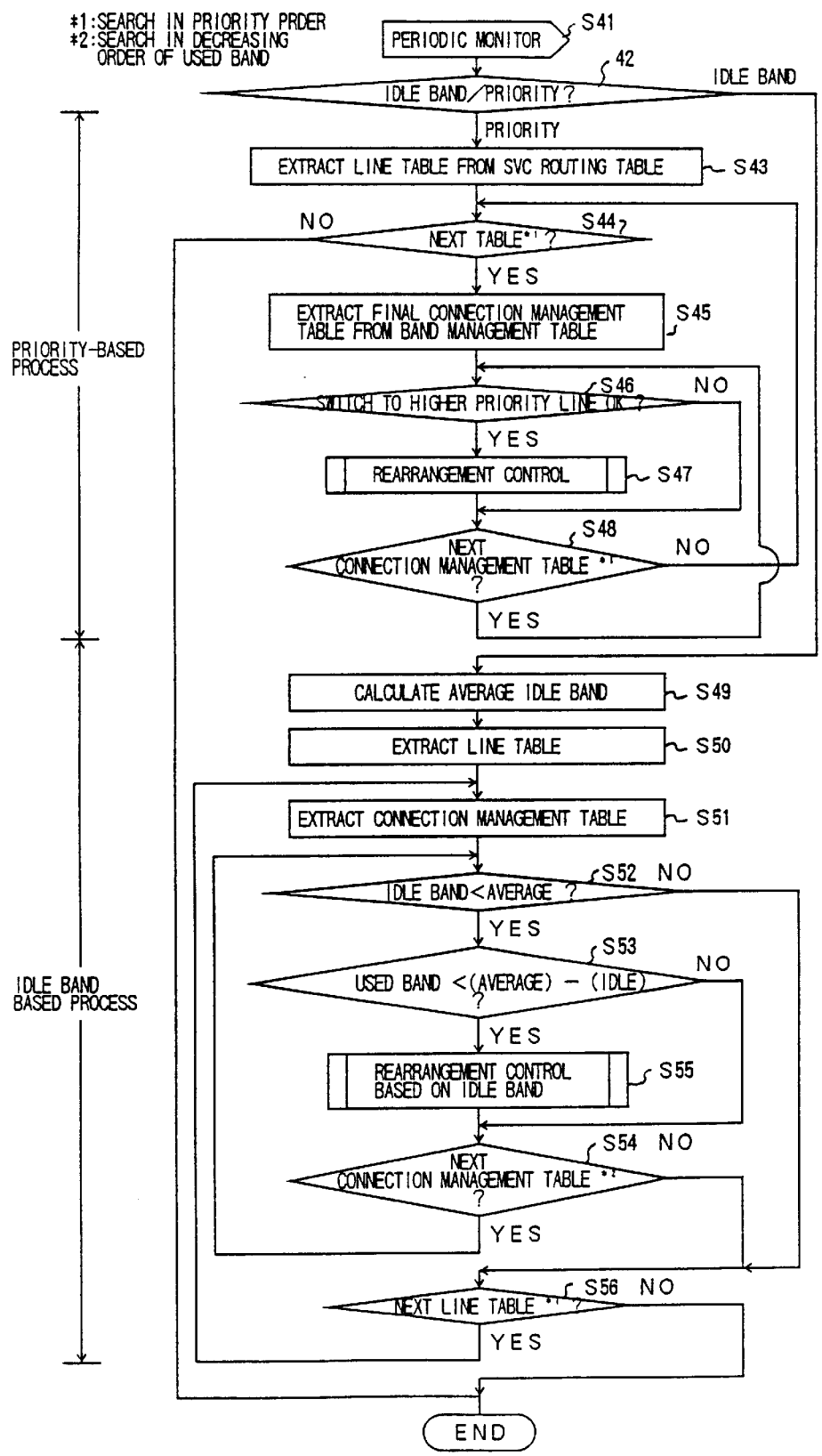
FIG. 18 is a flowchart of a periodic monitor process.

The ATM device of the present invention can rearrange a connection by a process other than the processes shown in FIGS. 6 through 8. An example of such a process will be described with reference to FIG. 18.

It will be assumed that there are connections shown in FIG. 19(*a*) at the time when the band monitor part 12 and the connection monitor part 13 periodically monitor the lines and connections (step S41). In the state shown in FIG. 19(*a*), the ATM devices 1*a* and 1*b* are connected together by the lines A and B, each having a band of 156 Mbps. The lines A and B respectively have priority levels 1 and 2. Two connections are formed on the line A. More particularly, on the line A are set a 60 Mbps connection connecting the terminals A and O and a 30 Mbps connection connecting the terminals B and P. A 30 Mbps connection connecting the terminals C and Q is set on the line B.

The connection rearrangement part 3 determines which one of the two connection rearrangement methods (based on the first and second criteria) is installed in the periodic monitor part 4 (step S42).

If it is determined, at step S42, that the rearrangement method based on the priority (criterion 2) is installed in the periodic monitor part 4, the part 4 notifies the connection rearrangement part 3 of the connection rearrangement request based on the information from the band monitor part 12 and the connection monitor part 13, if the connections are not defined in accordance with the priority as shown in FIG. 19(*a*).

The line selecting part 10 searches the SVC routing table 15, and extracts the lines A and B as the line tables related to the lines connecting the ATM devices 1*a* and 1*b* in the order of priority, as shown in FIG. 19(*a*) (step S43). The line selecting part 10 checks the line table of the line A having the higher priority, and determines whether the next line table is available (step S44).

In the present case, the next line table of the line B is available, and the line selecting part 10 extracts a connection management table final pointer from the band management table 16 of the line B. Then, using the extracted pointer, the line selecting part 10 extracts the connection connecting the terminals C and Q as the final connection management table 17 (step S45).

The line selecting part 10 checks whether the connection connecting the terminals C and Q on the line B can be moved to the line A (step S46). The connection between the terminals C and Q can be moved to the 66 Mbps idle band of the line A (the result of step S46 is YES), and thus, the line selecting part 10 requests the rearrangement control part 11 to execute the rearrangement. Then, the rearrangement control part 11 moves the connection connecting the terminals C and Q set on the line B to the line A (step S47). After the connection is moved, the line selecting part 10 determines whether there is a connection preceding the final connection on the line B (step S48).

In the case shown in FIG. 19(*a*), there is no connection on the line B other than the connection connecting the terminals C and Q. Hence, the line selecting part 10 accesses the line table of the line B, and extracts the next line table pointer therefrom in order to determine whether the next line table is available (step S44). There is no line connecting the ATM devices 1*a* and 1*b* other than the lines A and B, and thus the rearrangement control part 11 completes the rearrangement carried out at the time of the periodic monitor.

If it is determined, at step S46, that the rearrangement cannot be done, the line selecting part 10 determines whether there is a connection preceding the final connection on the line B (step S48). If it is determined, at step S48, that there is another connection connecting the terminals C and Q on the line B, the process starting from step S46 and ending with step S48 is repeatedly executed until no connection becomes available.

As to the process of step S42, if the connection rearrangement method directed to averaging the idle bands of the lines after the rearrangement (based on the first criterion), the periodic monitor part 4 notifies the connection rearrangement part 3 of the connection rearrangement request based on the information from the band monitor part 12 and the connection monitor part 13, if the connections are set so that the bands of the lines are not averaged.

The line selecting part 10 retrieves the SVC routing table 15, and extracts A and B in the priority order as the line tables connecting the ATM devices 1*a* and 1*b*, as shown in FIG. 19(*a*). Then, the line selecting part 10 extracts an idle band of 66 Mbps of the line A and an idle band of 126 Mbps of the line B from the band management tables 16, and calculates the average idle band of the lines A and B (step S49).

The line selecting part 10 extracts the line A as the line tables of the lines between the ATM devices 1*a* and 1*b* (step S50). Then, the line selecting part 10 extracts the connection management table final pointer from the band management table 16 of the line, and extracts, by using the extracted pointer, the connection having the largest in-use band and connecting the terminals A and O as the final connection management table 17 of the line A (step S51).

The line selecting part 10 checks whether the idle band of the line A is less than the average idle band calculated at step S49 (step S52). The idle band of the line A is 66 Mbps, which is less than the average idle band (the result of step S52 is YES), the line selecting part 10 determines whether the band of the connection provided between the terminals A and O and extracted by the connection monitor part 13 is less than the band obtained by subtracting the idle band 66 Mbps of the line A from the average idle band (step S53). The in-use band of the connection connecting the terminals A and O is larger than the band obtained by subtracting the idle band of the line A from the average idle band (the result of step S53 is NO). Thus, the line selecting part 10 extracts the connection (30 Mbps) connecting the terminals B and P as the second largest connection management table 17 (step S54, YES).

The line selecting part 10 checks whether the idle band of the line A is less than the average idle band calculated at step S49 (step S52). The idle band of the line A is equal to 66 Mbps, which is less than the average idle band, and thus, the line selecting part 10 determines whether the in-use band 30 Mbps of the connection connecting the t terminals B and P is less than the band obtained by subtracting the idle band 66 Mbps of the line A from the average idle band (step S53). The connection connecting the terminals B and P is less than the band obtained by subtracting the idle band of the line A from the average idle band. Hence, the line selecting part 10 requests the rearrangement control part 11 to execute the rearrangement. The line control part 11 moves the connection connecting the terminals B and P on the line A to the line B (step S55), as shown in FIG. 19(*c*). After the correction rearrangement is executed, the line selecting part 10 confirms whether the third largest connection management table 17 is available.

In the case shown in FIG. 19(*a*), the line A does not have any connection other than the connection between the terminals A and O and the connection between the terminals B and P (the result of step S54 is NO). Hence, the line selecting line 10 searches the line table of the line A and extracts the line table next to the line table of the line A in order to determine whether the next line table is available (step S56).

Since the line table of the line B is available as the next line table, the line selecting part 10 extracts the connection management table final pointer from the band management table 16 of the line B. Then, the line selecting part 10 extracts, based on the extracted pointer, the connection (30 Mbps) connecting the terminals C and Q shown in FIG. 19(*c*) as the final connection management table 17 of the line B (step S51).

The line selecting part 10 checks whether the idle band of the line B is less than the average idle band (step S52). The idle band of the line B is equal to 96 Mbps, which is also equal to the average idle band. Hence, the line selecting part 10 searches the line table of the line B, and extracts the line table pointer next to the line table of the line B in order to determine whether the next line table is available (step S56).

There is no line connecting the ATM devices 1*a* and 1*b* other than the lines A and B. Hence, the rearrangement control part 11 ends the rearrangement based on the periodic monitor.

The ATM device 1 is equipped with the band monitor part 12 and the connection monitor part 13, and can periodically monitor the state of the connections set on the lines. Hence, the degree of freedom in setting the connections can be improved. For example, connections can be moved to a certain single line, while the other lines have sufficient idle bands. Since the connections can evenly be set on the lines, the number of connections to be moved can be reduced at the time of requesting a call setup. In addition, the traffic of the respective lines can be averaged, and the qualities of the lines can be maintained in the stable state.

Figure 20:
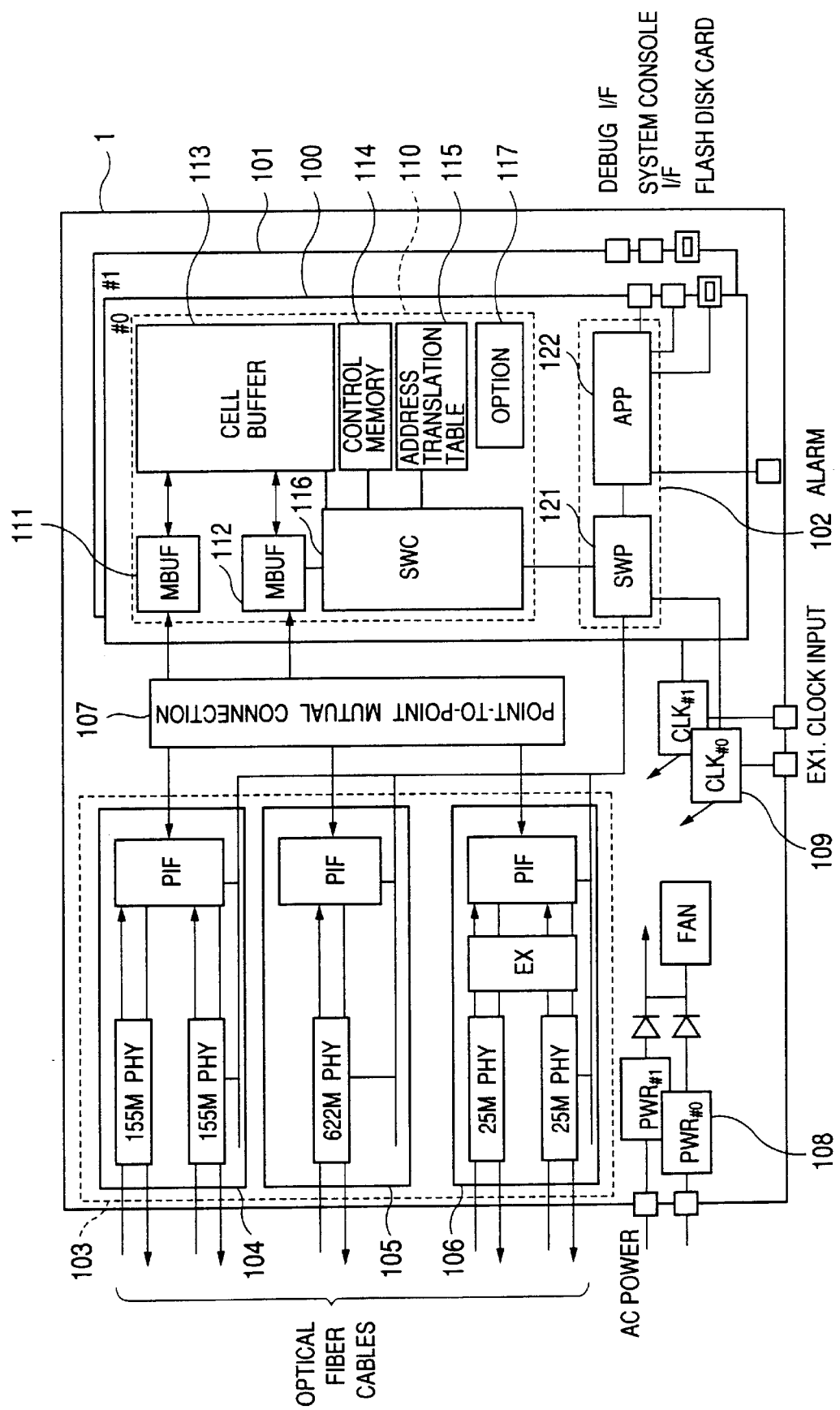
FIG. 20 is a block diagram of a hardware structure of the ATM device according to the embodiment of the present invention.

FIG. 20 is a block diagram of a hardware structure of the ATM device 1. It will be noted that the block structure shown in FIG. 2 is based on the functions of the ATM device 1.

The ATM device 1 includes duplicated main boards 100 and 101, an adapter part 103, a point-to-point mutual connection part 107, a dual power supply system 108 and a dual clock system 109. Each of the main boards (#0, #1) 100 and 101 includes a switch part 110 and a control part 102. The switch part 110 performs an ATM switching operation. The control part 102 controls the whole operation of the ATM device 1. The adapter part 103 includes a plurality of adapters 104, 105 and 106, each of which realizes an interface between an optical fiber cable and the ATM device 1. The point-to-point mutual connection part 107 interfaces the switch parts 110 of the boards 100 and 101 and the adapter part 103 with each other. The dual power supply system 108 supplies the components of the ATM device 1 with electricity. The clock supply system 109 receives clock signals from an external device and supplies the components with clock signals.

The switch part 110 includes buffers (MBUF) 111 and 112, a cell buffer 113, a control memory 114, an address translation table 115, a cell routing switch (SWC) 116, and an optional unit 117. The buffers 111 and 112 are write/read buffers provided between the point-to-point mutual connection part 107 and the cell buffer 113. The cell routing switch 116 performs a write/read control by which cells are written into and read from the cell buffer 113, and performs routing on the basis of control information stored in the control memory 114 and the address translation table 115. The cell buffer 113 temporarily stores cells under the control of the cell routing switch 116. The control memory 114 stores the contents of a cell header of each cell, and pointers used to store the cells in the cell buffer 113. The address translation table 115 stores information concerning the VPI/VCI translation necessary for cell routing and connections. The optional unit 117 is an interface unit which provides the switch part 110 with a new function such as a cell count on the UPC/IPD/VC base.

The control unit 102 includes a switch processor (SWP) 121 and an application unit (APP) 122. The switch processor 121 controls the components of the switch part 110 and the adapter part 103 and informs the application unit 122 with scan information. The application unit 122 performs a traffic management, an interface with a console, and various input/output controls such as a debug I/F, a system console I/F, a flash disk card for storing a system control program and configuration data, and an alarm output.

The adapter 103 is a packaged component and includes 155 Mbps termination units PHY and an interface PIF. The 155 Mbps termination units PHY are connected to optical fiber cables and terminate physical interfaces such as optic-to-electric and electric-to-optic converters. The interface PIF has the function of multiplexing and demultiplexing with respect to the switch part 110 via the mutual connection part 107. The adapter 105 includes a 622 Mbps termination unit PHY and an interface PIF. The adapter 106 includes 25 Mbps termination units PHY, an exchange unit EX and an interface PIF. The exchange unit EX exchanges the logic between the termination units PHY and the interface PIF.

The dual power supply system 108 generates internal power supply voltages from external AC power supply voltages. One of the internal power supply voltages is applied to a fan (FAN), which cools the inside of the ATM device 1.

The call setup part 2, the connection rearrangement part 3 and the periodic monitor part 4 shown in FIG. 2 corresponds to the combination of the switch part 110 and the control part 102.

Figure 21:
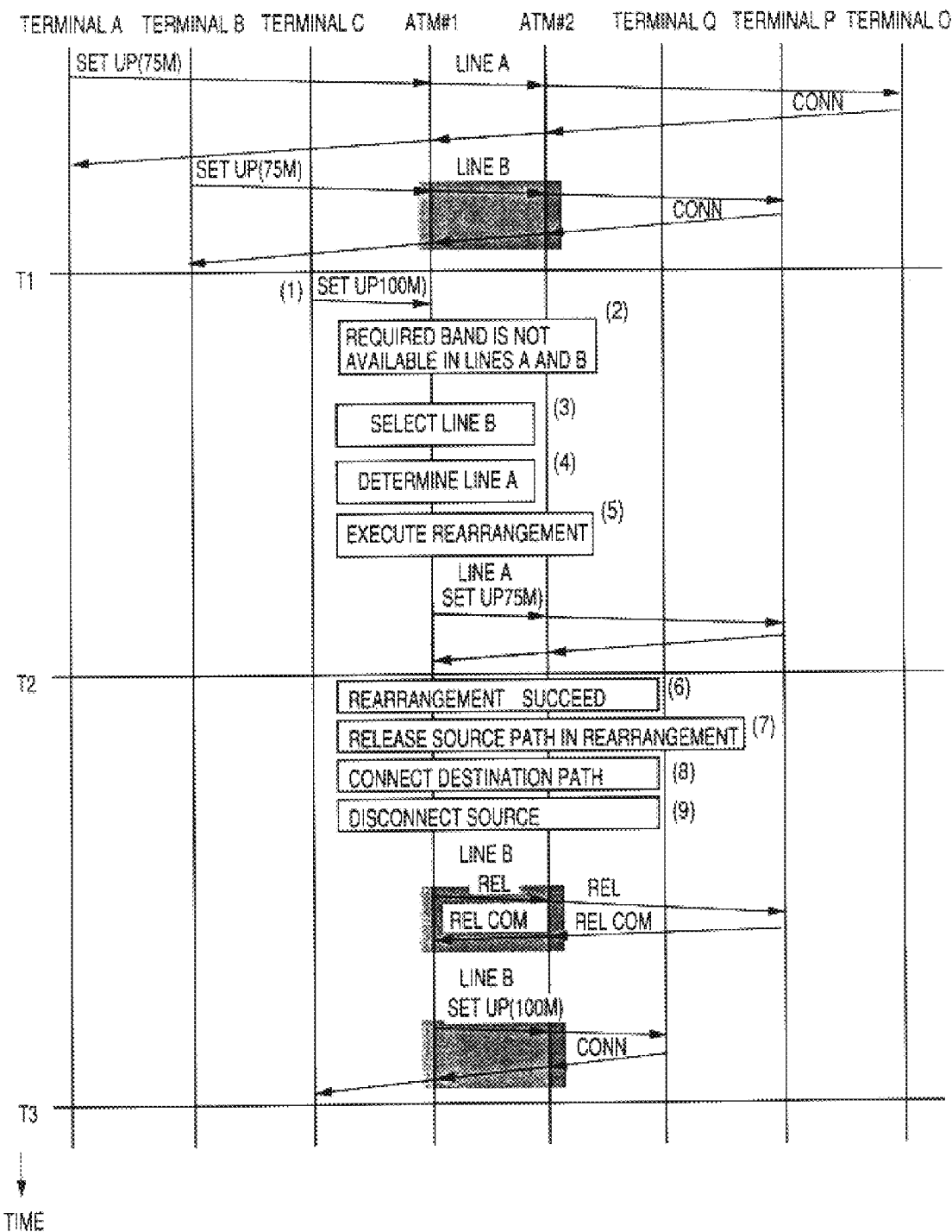
FIG. 21 is a sequence diagram of a connection rearrangement process.
Figure 22:
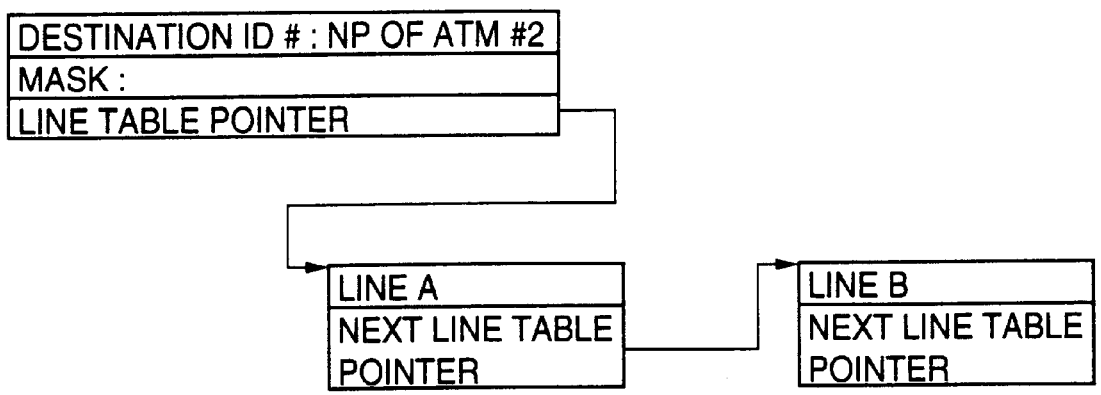
FIG. 22 shows the contents of the SVC routing table related to the sequence shown in FIG. 21.
Figure 23:
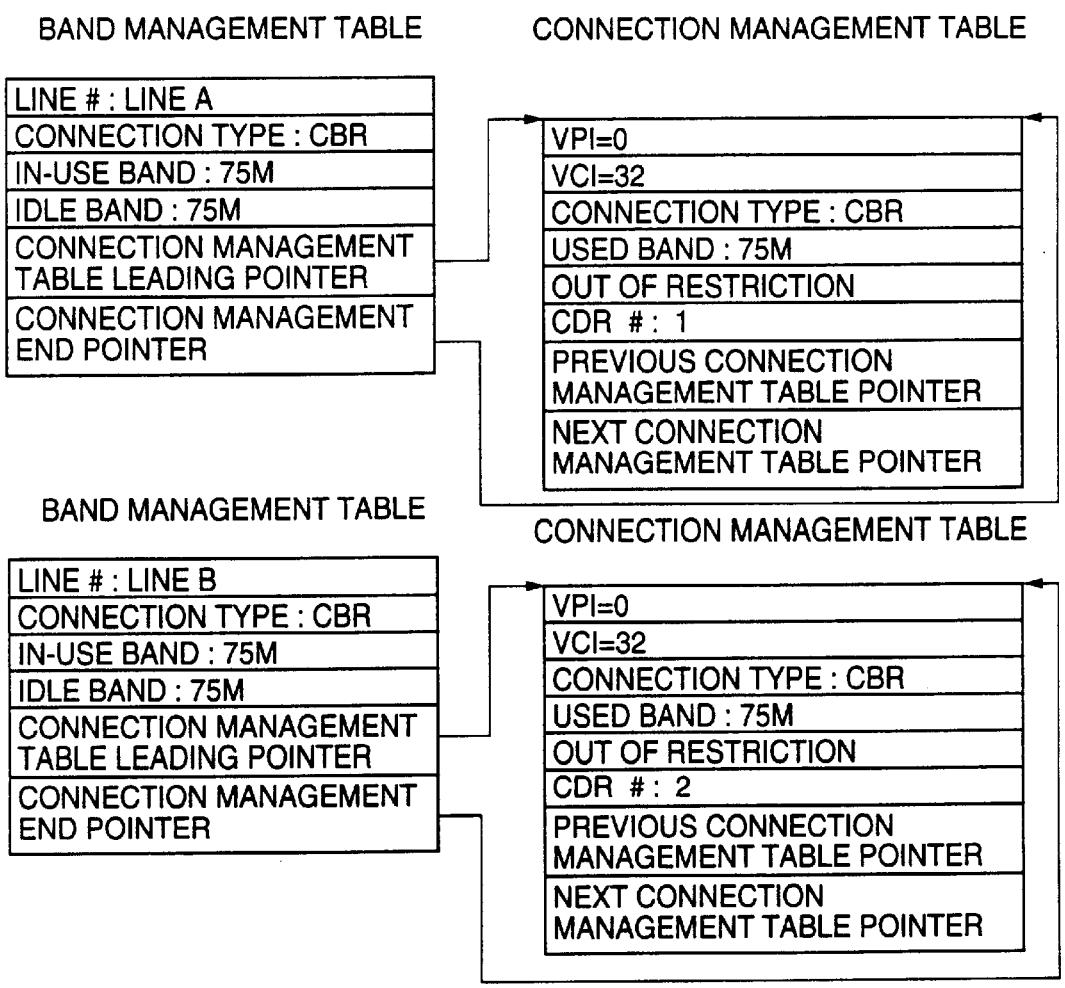

A description will now be given of an example of the connection rearrangement operation carried out by the ATM device 1 shown in FIG. 20 by referring to FIGS. 21 through 25. FIG. 21 shows that two ATM devices #1 and #2 are connected together by lines A and B, each having a band of 156 Mbps. The terminals A, B and C are connected to the ATM #1, and the terminals 0, P and Q are connected to the ATM #2. A 75 Mbps connection between the terminals A and O is provided on the line A, and a 75 Mbps connection between the terminals B and P is provided on the line B. It will be assumed that the 75 Mbps connection on the line A uses VPI=0 and VCI=32, and the 75 Mbps connection on the line B uses VPI=0 and VCI=32. The contents of the band management tables 16 and the connection management tables 17 are shown in FIG. 23 as those obtained at time T1 shown in FIG. 21.

In this state, it will be assumed that the terminal C issues a call setup request which is directed to the terminal Q and uses a 100 Mbps band of the CBR type as indicated by reference (1) in FIG. 21. The ATM device #1 receives the above call setup request and performs the connection rearrange process as follows. In the following description, the connection between the terminals B and P is moved (rearranged) to the line A, and the connection between the terminals C and Q are set on the line B.

In this case, the ATM device #1 recognizes that the 100 Mbps connection cannot be set on the lines A and B as indicated by reference (2). The connection search part 9 of the ATM device #1 shown in FIG. 2 selects the connection on the line B which is to be moved as indicated by reference (3). The line selecting part 10 of the ATM device #2 determines the line A to which the connection on the line B should be moved as indicated by reference (4). Then, the rearrangement control part 11 of the ATM device #1 performs the connection rearrangement as indicated by reference (5).

At the time T2 when the connection rearrangement has been executed, the band management tables 16 of the lines A and B and the connection management tables 17 have the contents shown in FIG. 24. In the band management table 16 of the line A, the information concerning the connection between the terminals A and O and the rearranged information concerning the connection between the terminals B and P are stored. Since the two connections are now set on the line A, a band of 150 Mbps is in use. The information concerning the connection between the terminals B and P is deleted from the band management table 16 of the line B.

Then, the rearrangement control part 11 of the ATM device #1 confirms that the rearrangement is successful as indicated by reference (6) shown in FIG. 21, and releases the rearrangement source path (connection) as indicated by reference (7). Then, the rearrangement control part 11 connects a rearrangement destination path (connection) as indicated by reference (8). Finally, the rearrangement control part 11 disconnects the rearrangement source path (connection) as indicated by reference (9).

At the time T3 when the step (9) has been executed, the band management tables 16 of the lines A and B and the connection management tables 17 have the contents shown in FIG. 25. In the band management table 16 of the line B, the information concerning the connection between the terminals C and Q is defined.

In short, a connection on a line can be periodically moved to another line in accordance with priority given to the lines. It is also possible to move a connection on a line to another line so that the idle bands of the lines are averaged.

According to the present invention, even if the ATM device receives a call setup request with a band exceeding the idle bands of the lines, the appropriate connection or connections are identified and moved to other lines (rearrangement) so that an idle band capable of accommodating the requested band can be ensured. Hence, the ATM device can reduce the idle bands of the lines and can efficiently utilize the lines to set the connections of the SVC calls.

The present invention is not limited to the specifically disclosed embodiments, and variations and modifications may be made without departing from the scope of the present invention.

What is claimed is:

1. An ATM device which can be connected to an ATM network via lines, said ATM device comprising:

a first part setting connections on the lines; and a second part moving a connection on a line to another line if a call setup requests a band greater than idle bands of the lines so that the band requested by the call setup can be set on the line from which the connection is moved.

2. The ATM device as claimed in claim 1, further comprising a control information memory part which stores control information concerning states of the lines and states of connections set on the lines, wherein the second part moves the connection by referring to the control information.

3. The ATM device as claimed in claim 1, wherein the second part comprises:

a connection search part which searches for a connection set on a line to be moved to another line by referring to control information concerning states of the lines and states of connections set on the lines;

a line selecting part which selects a line to which the connection searched for should be moved by referring to the control information; and a rearrangement part which moves the connection searched for to the line selected by the line selecting part.

4. The ATM device as claimed in claim 1, wherein the second part moves a connection on a line which has a minimum idle band after the connection is moved, as compared to the idle bands of the other lines.

5. The ATM device as claimed in claim 2, wherein the second part moves a connection on a line which has a minimum idle band after the connection is moved, as compared to the idle bands of the other lines.

6. The ATM device as claimed in claim 3, wherein the connection search part searches for a connection on a line which has a minimum idle band after the connection is moved, as compared to the idle bands of the other lines.

7. The ATM device as claimed in claim 1, wherein the second part moves a connection from a line which allows connections to be moved therefrom.

8. The ATM device as claimed in claim 2, wherein:

the control information memory part includes information indicating types of connections; and the connection search part searches for a connection from a line which allows connections to be moved therefrom by referring to the types of the connections.

9. The ATM device as claimed in claim 1, wherein the second part moves a connection from a line to another line which has a maximum idle band after receiving the connection moved, as compared to idle bands of the other lines.

10. The ATM device as claimed in claim 2, wherein the second part moves a connection from a line to another line which has a maximum idle band after receiving the connection moved, as compared to idle bands of the other lines by referring to the control information.

11. The ATM device as claimed in claim 2, wherein the connection search part searches for a connection set on a line to be moved to another line which has a maximum idle band after receiving the connection moved, as compared to idle bands of the other lines by referring to the control information.

12. The ATM device as claimed in claim 1, wherein the second part moves a connection from a line to another line in accordance with types of connections.

13. The ATM device as claimed in claim 2, wherein the second part moves a connection from a line to another line in accordance with types of connections.

14. The ATM device as claimed in claim 3, wherein:

the control information memory part includes information indicating types of the connections; and the line selecting part selects a line to which the connection should be moved by referring to the types of the connections.

15. The ATM device as claimed in claim 1, wherein the second part moves a connection from a line to another line in accordance with priority assigned to the lines.

16. The ATM device as claimed in claim 2, wherein the second part moves a connection from a line to another line in accordance with priority assigned to the lines.

17. The ATM device as claimed in claim 3, wherein:

the control information memory part includes information indicating priority assigned to the lines; and the line selecting part selects a line to which the connection should be moved by referring to the priority.

18. The ATM device as claimed in any of claims 1, further comprising a periodic monitor part which periodically monitors states of the lines and states of connections set thereon and obtain information concerning the states thereof, the second part moving a connection set on a line to another line in accordance with the information obtained by the periodic monitor part.

19. The ATM device as claimed in claim 1, wherein the second part periodically moves a connection on a line to another line in accordance with priority assigned to the lines.

20. The ATM device as claimed in claim 1, wherein the second part periodically moves a connection on a line to another line so that idle bands of the lines are averaged.

21. The ATM device as claimed in either claim 1, wherein the second part moves a connection on a line from another line in accordance with information which is asked to be checked by a request of the call setup and prevents a connection which is not allowed to be moved to another line from being moved.

22. The ATM device as claimed in claim 3, wherein the connection search part refers to information which is asked to be checked by a request of the call setup and prevents a connection which is not allowed to be moved to another line from being moved and searches for the line.

* * * * *